(12) United States Patent
Kim et al.

(10) Patent No.: US 11,873,372 B2
(45) Date of Patent: Jan. 16, 2024

(54) POLYAMIDE-IMIDE FILM, PREPARATION METHOD THEREOF, AND COVER WINDOW COMPRISING SAME

(71) Applicant: SK microworks Co., Ltd., Gyeonggi-do (KR)

(72) Inventors: Han Jun Kim, Gyeonggi-do (KR); Sunhwan Kim, Incheon (KR); Dae Seong Oh, Seoul (KR); Jin Woo Lee, Seoul (KR); Sang Hun Choi, Seoul (KR); Jung Hee Ki, Gyeonggi-do (KR); Dong Jin Lim, Gyeonggi-do (KR)

(73) Assignee: SK MICROWORKS CO., LTD., Gyeonggi-do (KR)

( * ) Notice: Subject to any disclaimer, the term of this patent is extended or adjusted under 35 U.S.C. 154(b) by 403 days.

(21) Appl. No.: 16/912,942

(22) Filed: Jun. 26, 2020

(65) Prior Publication Data
US 2020/0407506 A1   Dec. 31, 2020

(30) Foreign Application Priority Data

Jun. 28, 2019  (KR) .................. 10-2019-0078286
Nov. 19, 2019  (KR) .................. 10-2019-0148770
Mar. 27, 2020  (KR) .................. 10-2020-0037543

(51) Int. Cl.
  *C08G 73/14*   (2006.01)
  *C08J 5/18*    (2006.01)
  *C08K 3/26*    (2006.01)
  *C08K 3/105*   (2018.01)
  *C08K 3/16*    (2006.01)

(52) U.S. Cl.
  CPC ............... *C08G 73/14* (2013.01); *C08J 5/18* (2013.01); *C08K 3/105* (2018.01); *C08K 3/16* (2013.01); *C08K 3/26* (2013.01); *C08J 2379/08* (2013.01); *C08K 2003/262* (2013.01)

(58) Field of Classification Search
  CPC ............... C08G 73/14; C08G 73/1039; C08G 73/1007; C08G 73/1042; C08G 73/1067; C08K 3/105; C08K 3/16; C08K 3/26; C08K 2003/262; C08J 5/18; C08J 2379/08; C08L 2203/16; G02F 1/133723
  See application file for complete search history.

(56) References Cited

U.S. PATENT DOCUMENTS

2017/0218200 A1*  8/2017  Ahn ................... C08K 3/28
2018/0044475 A1*  2/2018  Park .................. C08G 73/1042

* cited by examiner

*Primary Examiner* — Robert S Jones, Jr.
*Assistant Examiner* — Jiangtian Xu
(74) *Attorney, Agent, or Firm* — IP & T GROUP LLP

(57) ABSTRACT

Embodiments relate to a polyamide-imide film that maintains its mechanical properties at least at a certain level under the conditions of high temperatures and low temperatures and is excellent in transparency and folding characteristics, a process for preparing the same, and a cover window comprising the same. The polyamide-imide film comprises a polyamide-imide polymer and has an $MO_R$ value defined in Equation 1a of 75% or more.

10 Claims, 3 Drawing Sheets

POLYAMIDE-IMIDE FILM, PREPARATION METHOD THEREOF, AND COVER WINDOW COMPRISING SAME

The present application claims priority of Korean patent application numbers 10-2019-0078286 filed on Jun. 28, 2019, 10-2019-0148770 filed on Nov. 19, 2019 and 10-2020-0037543 filed on Mar. 27, 2020. The disclosure of each of the foregoing applications is incorporated herein by reference in its entirety.

TECHNICAL FIELD

Embodiments relate to a polyamide-imide film that maintains its mechanical properties at least at a certain level under the conditions of high temperatures and low temperatures and is excellent in transparency and folding characteristics, a process for preparing the same, and a cover window comprising the same.

BACKGROUND ART OF THE INVENTION

Polyimide-based resins such as poly(amide-imide) (PAI) are excellent in resistance to friction, heat, and chemicals. Thus, they are employed in such applications as primary electrical insulation, coatings, adhesives, resins for extrusion, heat-resistant paintings, heat-resistant boards, heat-resistant adhesives, heat-resistant fibers, and heat-resistant films.

Polyimide is used in various fields. For example, polyimide is made in the form of a powder and used as a coating for a metal or a magnetic wire. It is mixed with other additives depending on the applications thereof. In addition, polyimide is used together with a fluoropolymer as a painter for decoration and corrosion prevention. It also plays a role of bonding a fluoropolymer to a metal substrate. In addition, polyimide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyimide has been developed in the form of a film, which is less expensive and has excellent optical, mechanical, and thermal characteristics. Such a polyimide-based film may be applied to display materials for organic light-emitting diodes (OLEDs) or liquid crystal displays (LCDs), and the like, and to antireflection films, compensation films, and retardation films if retardation properties are implemented.

Such a polyimide-based film has a problem that its physical properties are rapidly deteriorated in a high-temperature or low-temperature environment. In order to solve this problem, additives are introduced, in which case the optical properties or compatibility may be impaired.

In addition, in the case where the polyimide-based film is applied to a display device, the transparent cover window adopted in the display device comprises a hard-coating layer in addition to the polyimide-based film. In the course of forming the hard-coating layer, the haze increases or the adhesion decreases, resulting in a deterioration in the optical properties.

Thus, there has been a continuous demand for research on the development of a film that maintains excellent physical properties under the conditions of high temperatures and low temperatures and is excellent in mechanical properties and optical properties while the above problem is solved.

DISCLOSURE OF THE INVENTION

Problem to be Solved

Embodiments aim to provide a polyamide-imide film that maintains its mechanical properties at least at a certain level under the conditions of high temperatures and low temperatures and is excellent in transparency and folding characteristics, a process for preparing the same, and a cover window comprising the same.

Solution to the Problem

The polyamide-imide film according to an embodiment comprises a polyamide-imide polymer and has an $MO_R$ value defined in the following Equation 1a of 75% or more.

$$MO_R(\%) = (MO_{2a}/MO_{1a}) \times 100 \quad \text{[Equation 1a]}$$

$MO_{1a}$ refers to the modulus of the film at room temperature, and $MO_{2a}$ refers to the modulus of the film at 60° C.

The cover window for a display device according to another embodiment comprises a polyamide-imide film and a functional layer, wherein the polyamide-imide film comprises a polyamide-imide polymer and has an $MO_R$ value defined in the above Equation 1a of 75% or more.

The polyamide-imide film according to an embodiment comprises a polyamide-imide polymer and has a modulus (MO) at room temperature of 5 GPa or more and a dMO value defined in the following Equation 1b of 1% to 8%.

$$dMO\ (\%) = \frac{|MO2b - MO1b|}{MO1b} \times 100 \quad \text{[Equation 1b]}$$

In Equation 1b, $MO_{1b}$ refers to the modulus of the film at room temperature, and $MO_2b$ refers to the modulus of the film measured at −20° C.

The process for preparing the polyamide-imide film comprises polymerizing a diamine compound, a dianhydride compound, and a dicarbonyl compound in an organic solvent to prepare a polyamide-imide polymer solution; charging the polymer solution into a tank; extruding and casting the polymer solution in the tank and then drying it to prepare a gel sheet; and thermally treating the gel sheet, wherein the thermal treatment of the gel sheet comprises hot air treatment in two or more steps.

Advantageous Effects of the Invention

The polyamide-imide film according to an embodiment not only is excellent in mechanical properties and optical properties, but also can maintain excellent mechanical properties even under the severe conditions of high temperature and low temperature.

In particular, when the polyamide-imide film is applied to a cover window for a display device and it is exposed to a high-temperature or low-temperature environment, it can maintain excellent durability and secure the stability and reliability of the display appearance. Thus, it is expected to enhance the quality of the display device.

Further, the polyamide-imide film according to an embodiment achieves excellent folding characteristics, so that it can be advantageously applied to a foldable display device or a flexible displace device.

DETAILED DESCRIPTION FOR CARRYING OUT THE INVENTION

Figure 1:
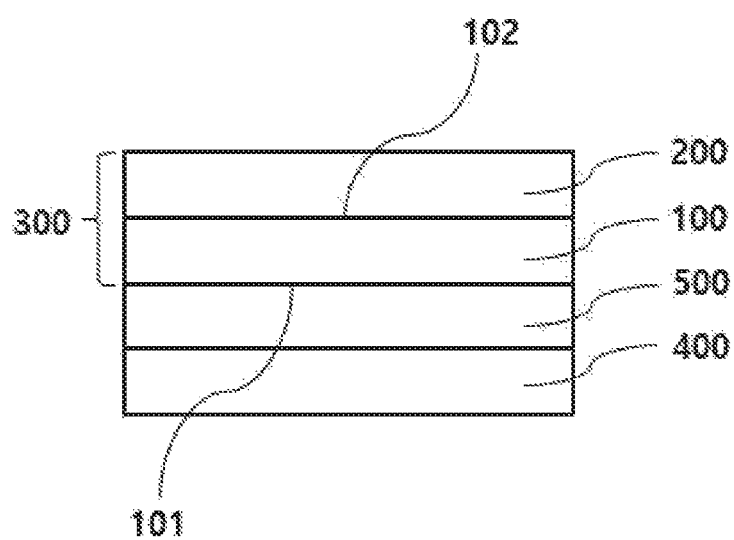
FIG. 1 is a cross-sectional view of a display device according to an embodiment.

Hereinafter, the embodiments will be described in detail with reference to the accompanying drawings so that those skilled in the art to which the present invention pertains may easily practice them. However, the embodiments may be implemented in many different ways and are not limited to those described herein.

Throughout the present specification, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is interpreted to cover a singular or plural number that is interpreted in context unless otherwise specified.

In addition, all numbers and expression related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

Polyamide-Imide Film

Embodiments provide a polyamide-imide film that not only is excellent in mechanical properties and optical properties, but also can maintain excellent mechanical properties even under the severe conditions of high temperature and extremely low temperature.

The polyamide-imide film according to an embodiment comprises a polyamide-imide polymer and has an $MO_R$ value defined in the following Equation 1a of 75% or more.

$$MO_R(\%) = (MO_{2a}/MO_{1a}) \times 100 \qquad \text{[Equation 1a]}$$

$MO_{1a}$ refers to the modulus of the film at room temperature, and $MO_{2a}$ refers to the modulus of the film at 60° C.

Specifically, the polyamide-imide film may have an $MO_R$ value defined in the above Equation 1a of 76% or more, 77% or more, 78% or more, 75% to 100%, 75% to 98%, 75% to 95%, 75% to 92%, 75% to 90%, 75% to 88%, or 75% to 85%, but it is not limited thereto.

If the $MO_R$ value of the polyamide-imide film satisfies the above range, the change in modulus under the conditions of high temperatures is small. Thus, it is possible to obtain a cover window and a display device having strong durability and excellent elasticity. These characteristics are particularly advantageous for application to a foldable display device and a rollable display device.

In particular, in the case where the film is applied to a cover window for a display device and to a display device, the temperature of the display device may be elevated due to the heat generated during its use since the display device is an electronic device. Thus, if the mechanical properties are rapidly deteriorated under the conditions of high temperatures, the stability and reliability of the display appearance may be impaired.

The polyamide-imide film has a $TS_R$ value defined in the following Equation 2a of 80% or more.

$$TS_R(\%) = (TS_{2a}/TS_{1a}) \times 100 \qquad \text{[Equation 2a]}$$

$TS_{1a}$ refers to the tensile strength of the film at room temperature, and $TS_{2a}$ refers to the tensile strength of the film at 60° C.

Specifically, the polyamide-imide film may have a $TS_R$ value defined in the above Equation 2a of 80% to 100%, 80% to 98%, 80% to 95%, 80% to 93%, 80% to 90%, 80% to 88%, or 80% to 85%, but it is not limited thereto.

The polyamide-imide film has an $EL_R$ value defined in the following Equation 3a of 80% or more.

$$EL_R(\%) = (EL_{2a}/EL_{1a}) \times 100 \qquad \text{[Equation 3a]}$$

$EL_{1a}$ refers to the elongation at break of the film at room temperature, and $EL_{2a}$ refers to the elongation at break of the film at 60° C.

Specifically, the polyamide-imide film may have an $EL_R$ value defined in the above Equation 3a of 80% to 100%, 80% to 98%, 80% to 95%, 80% to 93%, or 80% to 90%, but it is not limited thereto.

The polyamide-imide film has a modulus ($MO_{1a}$) of 6 GPa or more when measured at room temperature.

Specifically, the $MO_{1a}$ may be 6.1 GPa or more, 6.2 GPa or more, 6.3 GPa or more, 6.4 GPa or more, 6.5 GPa or more, 6.7 GPa or more, 6.0 GPa to 9.0 GPa, 6.0 GPa to 8.5 GPa, 6.0 GPa to 8.2 GPa, 6.0 GPa to 8.0 GPa, or 6.2 GPa to 7.8 GPa, but it is not limited thereto.

The polyamide-imide film has a tensile strength ($TS_{1a}$) of 25 kgf/mm² or more when measured at room temperature.

Specifically, the $TS_{1a}$ may be 27 kgf/mm² or more, 28 kgf/mm² or more, 30 kgf/mm² or more, 25 kgf/mm² to 50 kgf/mm², 25 kgf/mm² to 45 kgf/mm², 25 kgf/mm² to 40 kgf/mm², 25 kgf/mm² to 38 kgf/mm², 25 kgf/mm² to 35 kgf/mm², or 28 kgf/mm² to 35 kgf/mm², but it is not limited thereto.

The polyamide-imide film has an elongation at break ($EL_{1a}$) of 18% or more when measured at room temperature.

Specifically, the $EL_{1a}$ may be 18.5% or more, 19% or more, 19.5% or more, 20% or more, 20.5% or more, 21% or more, 18% to 35%, 18% to 32%, 18% to 30%, 18% to 28%, 18% to 25%, or 20% to 25%, but it is not limited thereto.

The polyamide-imide film has a modulus ($MO_{2a}$) of 5 GPa or more when measured at 60° C.

Specifically, the $MO_{2a}$ may be 5.1 GPa or more, 5.2 GPa or more, 5.3 GPa or more, 5.4 GPa or more, 5 GPa to 8.5 GPa, 5 GPa to 8.0 GPa, 5 GPa to 7.5 GPa, 5 GPa to 7.0 GPa, 5 GPa to 6.5 GPa, or 5 GPa to 6.0 GPa, but it is not limited thereto.

The polyamide-imide film has a tensile strength ($TS_{2a}$) of 20 kgf/mm$^2$ or more when measured at 60° C.

Specifically, the $TS_{2a}$ may be 21 kgf/mm$^2$ or more, 22 kgf/mm$^2$ or more, 22.5 or more, 23 kgf/mm$^2$ or more, 23.5 kgf/mm$^2$ or more, 24 kgf/mm$^2$ or more, 20 kgf/mm$^2$ to 35 kgf/mm$^2$, 20 kgf/mm$^2$ to 32 kgf/mm$^2$, 20 kgf/mm$^2$ to 30 kgf/mm$^2$, 20 kgf/mm$^2$ to 28 kgf/mm$^2$, 22 kgf/mm$^2$ to 28 kgf/mm$^2$, but it is not limited thereto.

The polyamide-imide film has an elongation at break ($EL_{2a}$) of 15% or more when measured at 60° C.

Specifically, the $EL_{2a}$ may be 15.5% or more, 16% or more, 16.5% or more, 17% or more, 17.5% or more, 18% or more, 15% to 30%, 15% to 28%, 15% to 25%, 15.5% to 25%, or 17% to 25%, but it is not limited thereto.

The modulus, the tensile strength, and the elongation at break may be measured by the following method.

The film is subjected to a load and stretched at a constant speed. In such event, the load applied to the film with respect to the strain of the film is obtained. The modulus, the tensile strength, and the elongation at break may be obtained from the load with respect to the strain.

The modulus, the tensile strength, and the elongation at break may be measured by a universal testing machine (UTM). The film may be cut to a predetermined size and measured for the modulus, the tensile strength, and the elongation at break using a UTM.

Specifically, the film is cut to a size of 10 mm×150 mm by a laser cutting equipment (HPT500HJ from Hardram) to prepare a sample. The sample is stretched at a test speed of 12.5 mm/min using a UTM to measure the modulus, the tensile strength, and the elongation at break.

Room temperature in the present specification refers to 20 to 25° C., specifically may be 25° C.

The modulus, the tensile strength, and the elongation at break may be measured by the above method while the temperature of the film is room temperature.

In addition, the modulus at 60° C., the tensile strength at 60° C., and the elongation at break at 60° C. may be measured by the above method as the modulus, the tensile strength, and the elongation at break are measured while the temperature of the film is about 60° C.

Specifically, the film is sufficiently heated at about 60° C. for about 3 minutes, and the modulus, the tensile strength, and the elongation at break may then be measured by the above method within 10 seconds.

More specifically, the film is sufficiently heated in an oven at about 60° C. for about 3 minutes, it is then taken out of the oven, and the modulus, the tensile strength, and the elongation at break may be measured by the above method using a UTM within 10 seconds.

In the cover window comprising the polyamide-imide film according to an embodiment, the $MO_R$ value, $TS_R$ value, $EL_R$ value, $MO_{1a}$ value, $TS_{1a}$ value, $EL_{1a}$ value, $MO_{2a}$ value, $TS_{2a}$ value, and $EL_{2a}$ value related to the mechanical properties satisfy the above ranges, so that it has strong durability under the conditions of high temperatures and is hardly deformed in physical properties. Thus, it can be advantageously applied to a display device.

Specifically, when a display device is used in a high-temperature environment such as a hot summer day, the mechanical properties are hardly changed. Thus, since the stability and reliability of the display appearance are secured, it is expected to enhance the quality of the display device.

In addition, when the display device is used for a long period of time, it generates heat. Thus, the stability and durability of the display device can be secured only when its thermal resistance is excellent.

The polyamide-imide film according to an embodiment comprises a polyamide-imide polymer and has a modulus ($MO_{1b}$) at room temperature of 5 GPa or more and a dMO value defined in the following Equation 1b of 1% to 8%.

$$dMO\ (\%) = \frac{|MO2b - MO1b|}{MO1b} \times 100 \qquad \text{[Equation 1b]}$$

In Equation 1b, $MO_{1b}$ refers to the modulus of the film at room temperature, and $MO_{2b}$ refers to the modulus of the film measured at −20° C.

The $MO_{2b}$ may be measured at a temperature within an error range recognized in the art.

The $MO_{2b}$ may be measured after the polyamide-imide film is left in a freezer at about −20° C. for 24 hours.

After the polyamide-imide film is taken out of the freezer, the $MO_{2b}$ may be measured in a state within an error range while the temperature of the polyamide-imide film is not elevated.

For example, the $MO_{2b}$ may be measured within about 1 minute after the polyamide-imide film is taken out of the freezer.

For example, the $MO_{2b}$ may be measured within about 50 seconds after the polyamide-imide film is taken out of the freezer.

For example, the $MO_{2b}$ may be measured within about 40 seconds after the polyamide-imide film is taken out of the freezer.

For example, the $MO_{2b}$ may be measured within about 30 seconds after the polyamide-imide film is taken out of the freezer.

For example, the $MO_{2b}$ may be measured within about 20 seconds after the polyamide-imide film is taken out of the freezer.

For example, the $MO_{2b}$ may be measured within about 10 seconds after the polyamide-imide film is taken out of the freezer.

The error range of the measurement temperature of the $MO_{2b}$ may be −20° C.±2° C. The error range of the measurement temperature of the $MO_{2b}$ may be −20° C.±1.5° C. The error range of the measurement temperature of the $MO_{2b}$ may be −20° C.±1° C. The error range of the measurement temperature of the $MO_{2b}$ may be −20° C.±0.5° C.

Specifically, the polyamide-imide film may have a dMO value defined in the above Equation b of 1.5% to 8%, 1.5% to 7%, 1.5% to 6%, 1.5% to 5%, 1.5% to 4%, 1.5% to 3.5%, or 2.0% to 3.5%, but it is not limited thereto.

If the dMO value of the polyamide-imide film satisfies the above range, the change in modulus under the conditions of low temperatures is small. Thus, it is possible to obtain a film having strong durability and excellent elasticity and a cover window and a display device comprising the same.

These characteristics are particularly advantageous for application to a foldable display device and a rollable display device.

In particular, in the case where the film is applied to a cover window for a display device and to a display device, the display device may be used in an extremely cold environment. Thus, it is important to secure mechanical properties at least at a certain level even in such an extremely cold environment.

If the dMO value is outside the above range, the physical properties are rapidly deteriorated under the conditions of low temperatures, so that the reliability of the display appearance is impaired, or when it is applied to a cover window for a display device, it is not balanced with other layers, resulting in defects in terms of the appearance stability.

In addition, the polyamide-imide film may have a modulus ($MO_{1b}$) at room temperature of 5.5 GPa or more, 5.8 GPa or more, 6.0 GPa or more, 6.2 GPa or more, 6.5 GPa or more, or 7.0 GPa or more, but it is not limited thereto.

The polyamide-imide film has a dTS value defined in the following Equation 2b of 1% to 20%.

$$dTS\ (\%) = \frac{|TS2b - TS1b|}{TS1b} \times 100 \qquad \text{[Equation 2b]}$$

In Equation 2b, $TS_{1b}$ refers to the tensile strength of the film at room temperature, and $TS_{2b}$ refers to the tensile strength of the film at −20° C.

The $TS_{2b}$ may be measured at a temperature within an error range recognized in the art.

The $TS_{2b}$ may be measured after the polyamide-imide film is left in a freezer at about −20° C. for 24 hours.

After the polyamide-imide film is taken out of the freezer, the $TS_{2b}$ may be measured in a state within an error range while the temperature of the polyamide-imide film is not elevated.

For example, the $TS_{2b}$ may be measured within about 1 minute after the polyamide-imide film is taken out of the freezer.

For example, the $TS_{2b}$ may be measured within about 50 seconds after the polyamide-imide film is taken out of the freezer.

For example, the $TS_{2b}$ may be measured within about 40 seconds after the polyamide-imide film is taken out of the freezer.

For example, the $TS_{2b}$ may be measured within about 30 seconds after the polyamide-imide film is taken out of the freezer.

For example, the $TS_{2b}$ may be measured within about 20 seconds after the polyamide-imide film is taken out of the freezer.

For example, the $TS_{2b}$ may be measured within about 10 seconds after the polyamide-imide film is taken out of the freezer.

The error range of the measurement temperature of the $TS_{2b}$ may be −20° C.±2° C. The error range of the measurement temperature of the $TS_{2b}$ may be −20° C.±1.5° C. The error range of the measurement temperature of the $TS_{2b}$ may be −20° C.±1° C. The error range of the measurement temperature of the $TS_{2b}$ may be −20° C.±0.5° C.

Specifically, the polyamide-imide film may have a dTS value defined in the above Equation 2b of 1.5% to 19%, 1.5% to 18%, 1.5% to 15%, 1.5% to 12%, 1.5% to 10%, or 1.5% to 7%, but it is not limited thereto.

The polyamide-imide film has a dEL value defined in the following Equation 3b of 5% to 30%.

$$dEL\ (\%) = \frac{|EL2b - EL1b|}{EL1b} \times 100 \qquad \text{[Equation 3b]}$$

In Equation 3b, $EL_{1b}$ refers to the elongation at break of the film at room temperature, and $EL_{2b}$ refers to the elongation at break of the film at −20° C.

The $EL_{2b}$ may be measured at a temperature within an error range recognized in the art.

The $EL_{2b}$ may be measured after the polyamide-imide film is left in a freezer at about −20° C. for 24 hours.

After the polyamide-imide film is taken out of the freezer, the $EL_{2b}$ may be measured in a state within an error range while the temperature of the polyamide-imide film is not elevated.

For example, the $EL_{2b}$ may be measured within about 1 minute after the polyamide-imide film is taken out of the freezer.

For example, the $EL_{2b}$ may be measured within about 50 seconds after the polyamide-imide film is taken out of the freezer.

For example, the $EL_{2b}$ may be measured within about 40 seconds after the polyamide-imide film is taken out of the freezer.

For example, the $EL_{2b}$ may be measured within about 30 seconds after the polyamide-imide film is taken out of the freezer.

For example, the $EL_{2b}$ may be measured within about 20 seconds after the polyamide-imide film is taken out of the freezer.

For example, the $EL_{2b}$ may be measured within about 10 seconds after the polyamide-imide film is taken out of the freezer.

The error range of the measurement temperature of the $EL_{2b}$ may be −20° C.±2° C. The error range of the measurement temperature of the $EL_{2b}$ may be −20° C.±1.5° C. The error range of the measurement temperature of the $EL_{2b}$ may be −20° C.±1° C. The error range of the measurement temperature of the $EL_{2b}$ may be −20° C.±0.5° C.

Specifically, the polyamide-imide film may have a dEL value defined in the above Equation 3b of 5% to 26%, 10% to 26%, 10% to 20%, 10% to 18%, 10% to 15%, or 10% to 12%, but it is not limited thereto.

The polyamide-imide film has a tensile strength ($TS_{1b}$) of 25 kgf/mm$^2$ or more when measured at room temperature.

Specifically, the $TS_{1b}$ may be 26 kgf/mm$^2$ or more, 27 kgf/mm$^2$ or more, 25 kgf/mm$^2$ to 50 kgf/mm$^2$, 25 kgf/mm$^2$ to 45 kgf/mm$^2$, 25 kgf/mm$^2$ to 40 kgf/mm$^2$, 25 kgf/mm$^2$ to 35 kgf/mm$^2$, 25 kgf/mm$^2$ to 32 kgf/mm$^2$, or 26 kgf/mm$^2$ to 30 kgf/mm$^2$, but it is not limited thereto.

The polyamide-imide film has an elongation at break ($EL_{1b}$) of 18% or more when measured at room temperature.

Specifically, the $EL_{1b}$ may be 18.5% or more, 19% or more, 18% to 35%, 18% to 32%, 18% to 30%, 18% to 28%, 18% to 25%, or 18% to 20%, but it is not limited thereto.

The polyamide-imide film has a modulus ($MO_{2b}$) of 5.05 GPa or more when measured at −20° C.

Specifically, the $MO_{2b}$ may be 5.5 GPa or more, 6.0 GPa or more, 6.5 GPa or more, 7.0 GPa or more, 5.05 GPa to 8.5 GPa, 5.5 GPa to 8.0 GPa, 5.5 GPa to 7.7 GPa, 5.5 GPa to 7.0 GPa, 6.0 GPa to 7.0 GPa, or 6.2 GPa to 6.4 GPa, but it is not limited thereto.

The polyamide-imide film has a tensile strength ($TS_{2b}$) of 22.5 kgf/mm² or more when measured at −20° C.

Specifically, the $TS_{2b}$ may be 23 kgf/mm² or more, 25 kgf/mm² or more, 22.5 kgf/mm² to 35 kgf/mm², 22.5 kgf/mm² to 32 kgf/mm², 25 kgf/mm² to 32 kgf/mm², or 26 kgf/mm² to 31 kgf/mm², but it is not limited thereto.

The polyamide-imide film has an elongation at break ($EL_{2b}$) of 17% or more when measured at −20° C.

Specifically, the $EL_{2b}$ may be 17% to 30%, 17% to 25%, 17% to 24%, or 17% to 22%, but it is not limited thereto.

The modulus, the tensile strength, and the elongation at break may be measured by the method as described above.

Specifically, the modulus, the tensile strength, and the elongation at break may be measured by the above method while the temperature of the film is room temperature.

In addition, the film is left in a low-temperature environment at −20° C. for 24 hours, and the modulus, the tensile strength, and the elongation at break may then be measured by the above method within 1 minute after it is taken out of the low-temperature environment.

The polyamide-imide film according to an embodiment may have an elongation-reflected modulus ($LMo_1$) according to the following Equation 4b of 0.5 GPa or more when measured at room temperature.

$$LMo_1(GPa)=(EL_{1b}/100)\times Mo_{1b} \quad \text{[Equation 4b]}$$

Specifically, the $LMo_1$ may be 1.0 GPa or more. The $LMo_1$ may be 1.1 GPa or more. The $LMo_1$ may be 1.2 GPa or more. The $LMo_1$ may be 1.3 GPa or more. The $LMo_1$ may be 1.4 GPa or more. The $LMo_1$ may be 5 GPa or less.

Since it has an $LMo_1$ satisfying the above value, when the polyamide-imide film according to an embodiment is applied to a foldable display, it is possible to suppress wrinkles at the folded part and to have enhanced flexural resistance at the same time.

The polyamide-imide film according to an embodiment may have an elongation-reflected modulus ($LMo_2$) according to the following Equation 5b of 0.6 GPa or more when measured at low temperatures.

$$LMo_2(GPa)=(EL_{2b}/100)\times Mo_{2b} \quad \text{[Equation 5b]}$$

Specifically, the $LMo_2$ may be 0.7 GPa or more. The $LMo_2$ may be 0.9 GPa or more. The $LMo_2$ may be 1.0 GPa or more. The $LMo_2$ may be 1.1 GPa or more. The $LMo_2$ may be 1.2 GPa or more. The $LMo_2$ may be 1.3 GPa or more. The $LMo_2$ may be 5 GPa or less.

Since it has an $LMo_2$ satisfying the above value, when the polyamide-imide film according to an embodiment is applied to a foldable display, it is possible to suppress wrinkles at the folded part and to have enhanced flexural resistance at the same time.

In the polyamide-imide film according to an embodiment, the dMO value, dTS value, dEL value, $MO_{1b}$ value, $TS_{1b}$ value, $EL_{1b}$ value, $MO_{2b}$ value, $TS_{2b}$ value, and $EL_{2b}$ value related to the mechanical properties satisfy the above ranges, so that it has strong durability under the severe conditions of low temperatures and is hardly deformed in physical properties. Thus, it can be advantageously applied to a display device.

Specifically, when a display device to which the film is applied is used in an extremely low-temperature environment, the mechanical properties are hardly changed. Thus, since the stability and reliability of the display appearance are secured, it is expected to enhance the quality of the display device.

The content of the residual solvent in the polyamide-imide film is 1,500 ppm or less, or 1,200 ppm or less.

For example, the content of the residual solvent in the film may be 1,000 ppm or less, 800 ppm or less, 700 ppm or less, 600 ppm or less, 500 ppm or less, 400 ppm or less, or 300 ppm or less, but it is not limited thereto.

The residual solvent refers to the amount of solvents that are not volatilized during the film production and remains in the polyamide-imide film finally produced.

If the content of the residual solvent in the polyamide-imide film exceeds the above range, the durability of the film may be deteriorated under the conditions of high temperatures or low temperatures, which, in particular, may have an impact on the mechanical strength and, in turn, on the subsequent processing of the film. In addition, if the content of the residual solvent exceeds the above range, the hygroscopicity of the film is expedited, resulting in a deterioration in the mechanical properties or the optical properties.

The polyamide-imide film according to an embodiment comprises a polyamide-imide polymer, which is prepared by polymerizing a diamine compound, a dianhydride compound, and a dicarbonyl compound.

The polyamide-imide polymer is a polymer that contains an amide repeat unit and an imide repeat unit.

Specifically, the polyamide-imide polymer comprises an imide repeat unit derived from the polymerization of the diamine compound and the dianhydride compound and an amide repeat unit derived from the polymerization of the diamine compound and the dicarbonyl compound.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

$$H_2N\text{-}(E)_e\text{-}NH_2 \quad \text{[Formula 1]}$$

In Formula 1,

E may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

e is selected from integers of 1 to 5. When e is 2 or more, the Es may be the same as, or different from, each other.

$(E)_e$ in Formula 1 may be selected from the groups represented by the following Formulae 1-1a to 1-14a, but it is not limited thereto.

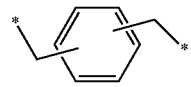

1-1a

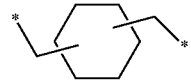

1-2a

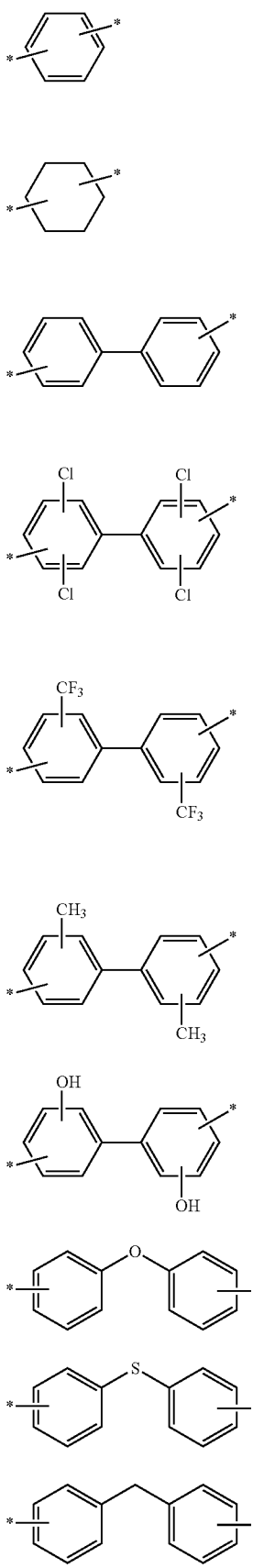
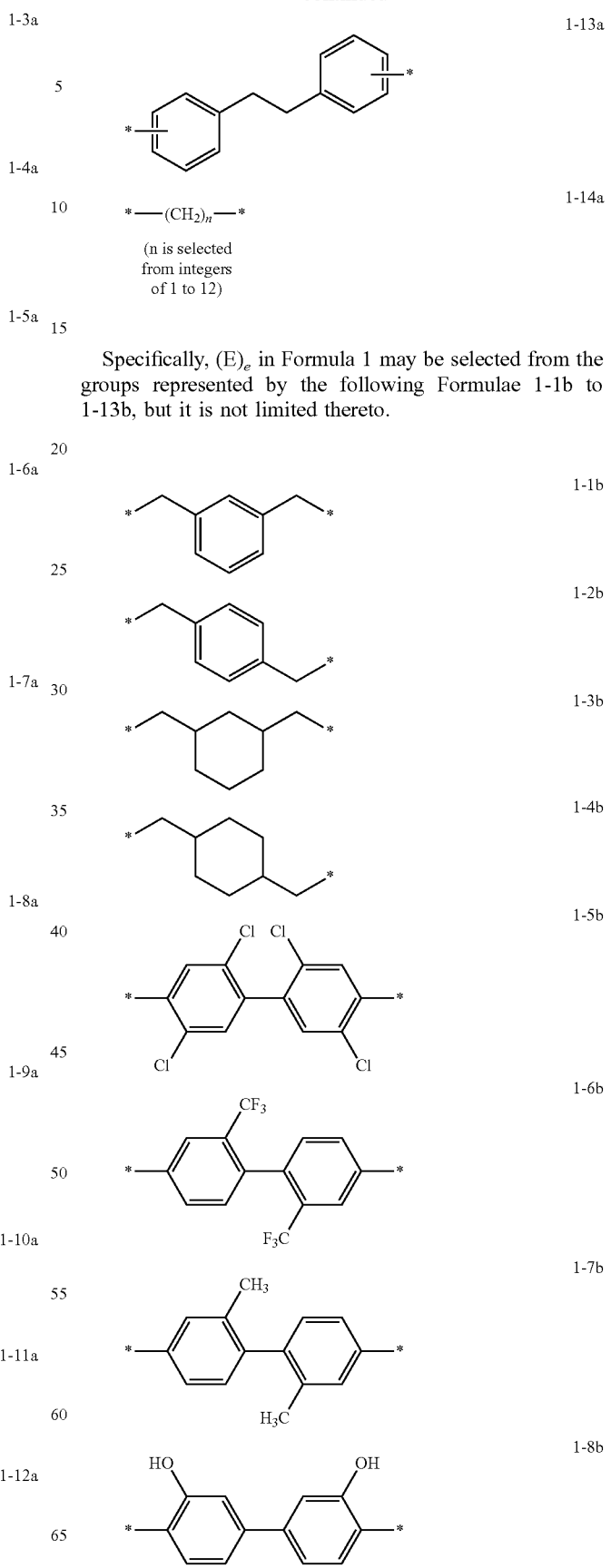
Specifically, $(E)_e$ in Formula 1 may be selected from the groups represented by the following Formulae 1-1b to 1-13b, but it is not limited thereto.

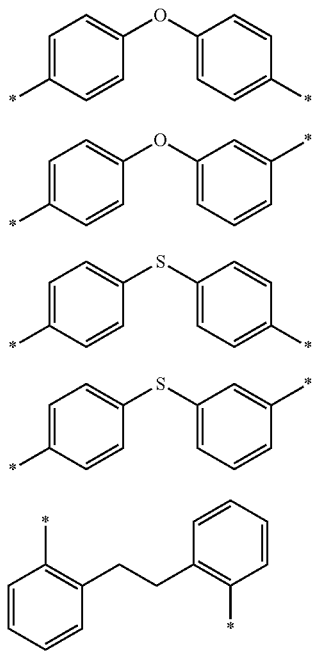

More specifically, (E)$_e$ in Formula 1 may be the group represented by the above Formula 1-6b or the group represented by the above Formula 1-9b.

In an embodiment, the diamine compound may comprise a compound having a fluorine-containing substituent or a compound having an ether group (—O—).

The diamine compound may be composed of a compound having a fluorine-containing substituent. In such event, the fluorine-containing substituent may be a fluorinated hydrocarbon group and specifically may be a trifluoromethyl group. But it is not limited thereto.

In another embodiment, one kind of diamine compound may be used as the diamine compound. That is, the diamine compound may be composed of a single component.

For example, the diamine compound may comprise 2,2'-bis(trifluoromethyl)-4,4'-diaminobiphenyl (TFMB) represented by the following formula, but it is not limited thereto.

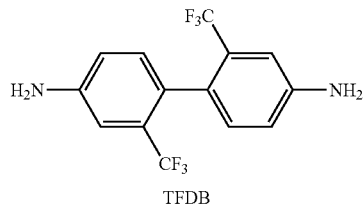

TFDB

The dianhydride compound has a low birefringence value, so that it can contribute to enhancements in the optical properties such as transmittance of a film that comprises the polyamide-imide polymer.

The dianhydride compound is not particularly limited, but it may be, for example, an aromatic dianhydride compound that contains an aromatic structure. For example, the aromatic dianhydride compound may be a compound represented by the following Formula 2.

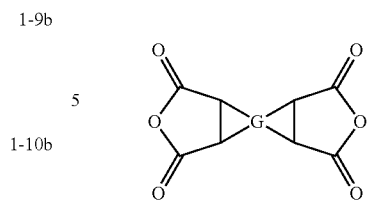

[Formula 2]

In Formula 2, G may be bonded by a bonding group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone or may be bonded to each other to form a condensed ring, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

G in Formula 2 may be selected from the groups represented by the following Formulae 2-1a to 2-9a, but it is not limited thereto.

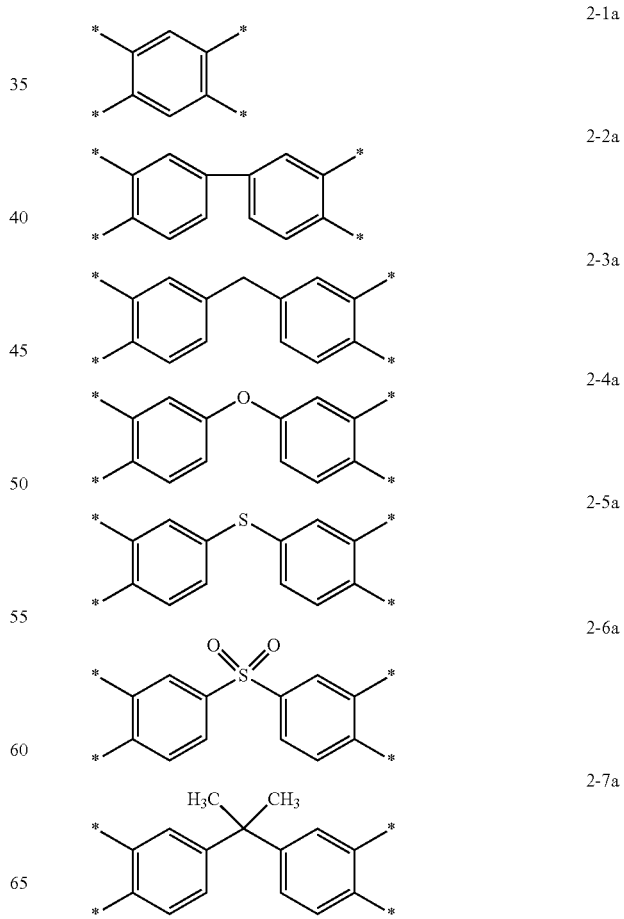

-continued

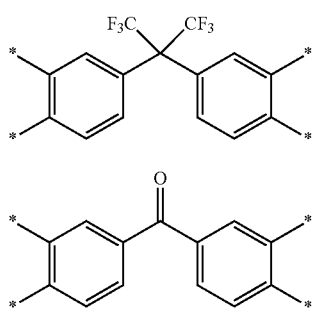

2-8a 2-9a

For example, G in Formula 2 may be the group represented by the above Formula 2-2a, the group represented by the above Formula 2-8a, or the group represented by the above Formula 2-9a.

In an embodiment, the dianhydride compound may comprise a compound having a fluorine-containing substituent, a compound having a biphenyl group, or a compound having a ketone group.

The dianhydride compound may be composed of a compound having a fluorine-containing substituent. In such event, the fluorine-containing substituent may be a fluorinated hydrocarbon group and specifically may be a trifluoromethyl group. But it is not limited thereto.

In another embodiment, the dianhydride compound may be composed of a single component or a mixture of two or more components.

For example, the dianhydride compound may comprise at least one selected from the group consisting of 2,2'-bis-(3,4-dicarboxyphenyl)hexafluoropropane dianhydride (6FDA) and 3,3',4,4'-biphenyltetracarboxylic dianhydride (BPDA), which have the following structures, but it is not limited thereto.

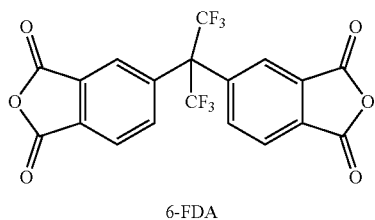

6-FDA

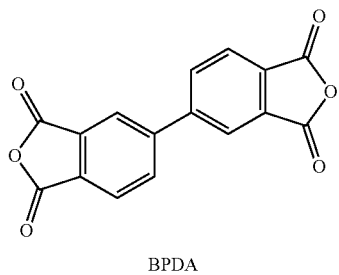

BPDA

The diamine compound and the dianhydride compound may be polymerized to form a polyamic acid.

Subsequently, the polyamic acid may be converted to a polyimide through a dehydration reaction, and the polyimide comprises an imide repeat unit.

The polyimide may form a repeat unit represented by the following Formula A.

[Formula A]

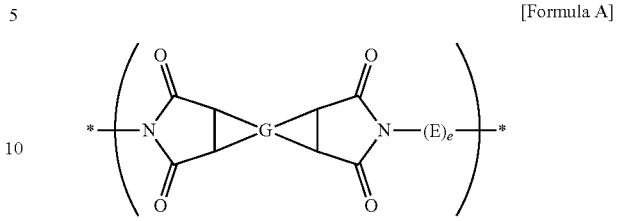

In Formula A, E, G, and e are as described above.

For example, the polyimide may comprise a repeat unit represented by the following Formula A-1, but it is not limited thereto.

[Formula A-1]

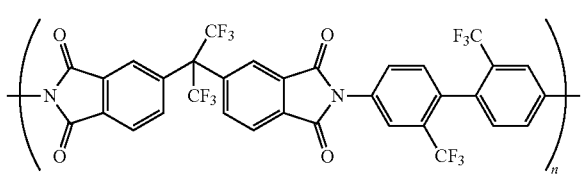

In Formula A-1, n is an integer of 1 to 400.

The dicarbonyl compound is not particularly limited, but it may be, for example, a compound represented by the following Formula 3.

[Formula 3]

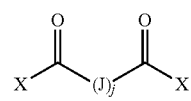

In Formula 3,

J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, the Js may be the same as, or different from, each other.

X is a halogen atom. Specifically, X may be F, Cl, Br, I, or the like. More specifically, X may be Cl, but it is not limited thereto.

(J)$_j$ in Formula 3 may be selected from the groups represented by the following Formulae 3-1a to 3-14a, but it is not limited thereto.

3-1a

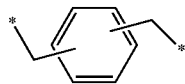

-continued 3-2a 

3-3a 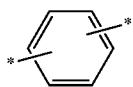

3-4a 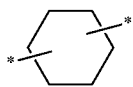

3-5a 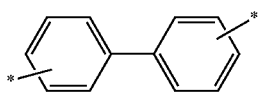

3-6a 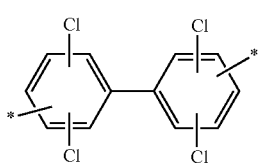

3-7a 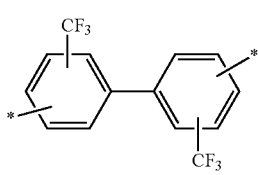

3-8a 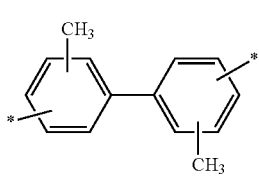

3-9a 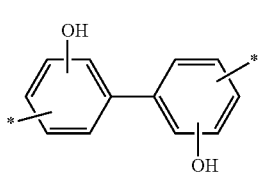

3-10a 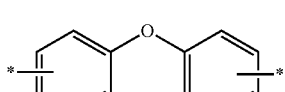

3-11a 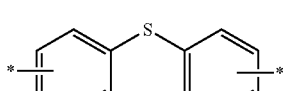

3-12a 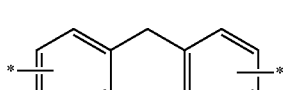

3-13a 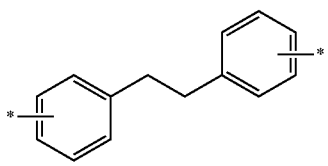

3-14a

\*—(CH$_2$)$_n$—\*

(n is selected from integers of 1 to 12)

Specifically, (J)$_j$ in Formula 3 may be selected from the groups represented by the following Formulae 3-1b to 3-8b, but it is not limited thereto.

3-1b 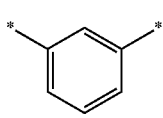

3-2b 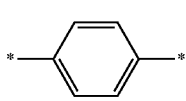

3-3b 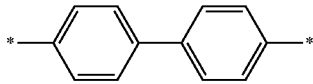

3-4b 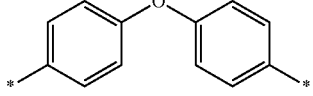

3-5b 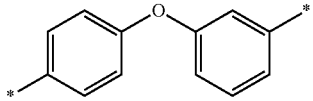

3-6b 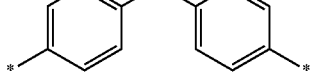

3-7b 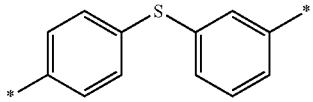

3-8b

More specifically, (J)$_j$ in Formula 3 may be the group represented by the above Formula 3-1b, the group represented by the above Formula 3-2b, the group represented by the above Formula 3-3b, or the group represented by the above Formula 3-8b.

For example, (J)$_j$ in the above Formula 3 may be the group represented by the above Formula 3-1b or the group represented by the above Formula 3-2b.

In an embodiment, a mixture of at least two kinds of dicarbonyl compounds different from each other may be used as the dicarbonyl compound. If two or more dicarbonyl compounds are used, at least two dicarbonyl compounds in which $(J)_j$ in the above Formula 2 is selected from the groups represented by the above Formulae 3-1b to 3-8b may be used as the dicarbonyl compound.

In another embodiment, the dicarbonyl compound may be an aromatic dicarbonyl compound that contains an aromatic structure.

For example, the dicarbonyl compound may comprise a first dicarbonyl compound and/or a second dicarbonyl compound.

The first dicarbonyl compound and the second dicarbonyl compound may be an aromatic dicarbonyl compound, respectively.

The first dicarbonyl compound and the second dicarbonyl compound may be compounds different from each other.

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of a film thus produced that comprises the polyamide-imide resin.

In addition, the first dicarbonyl compound and the second dicarbonyl compound may be structural isomers to each other.

If the first dicarbonyl compound and the second dicarbonyl compound are structural isomers to each other, the polymers are packed well with each other, thereby achieving excellent mechanical properties.

The dicarbonyl compound may comprise terephthaloyl chloride (TPC), 1,1'-biphenyl-4,4'-dicarbonyl dichloride (BPDC), isophthaloyl chloride (IPC), as represented by the following formulae, or a combination thereof. But it is not limited thereto.

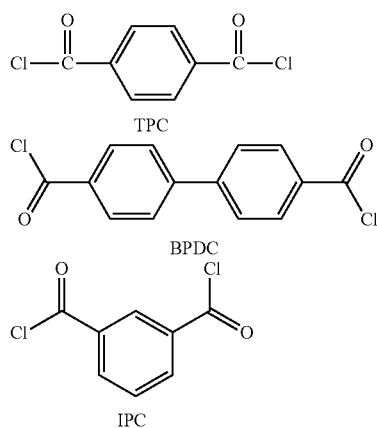

For example, the first dicarbonyl compound may comprise BPDC, and the second dicarbonyl compound may comprise TPC, but they are not limited thereto.

If BPDC is used as the first dicarbonyl compound and TPC is used as the second dicarbonyl compound in a proper combination, a film that comprises the polyamide-imide resin thus produced may have high oxidation resistance.

Alternatively, the first dicarbonyl compound may comprise IPC, and the second dicarbonyl compound may comprise TPC, but they are not limited thereto.

If IPC is used as the first dicarbonyl compound and TPC is used as the second dicarbonyl compound in a proper combination, a film that comprises the polyamide-imide resin thus produced may not only have high oxidation resistance, but is also economical since the costs can be reduced.

The diamine compound and the dicarbonyl compound may be polymerized to form a repeat unit represented by the following Formula B.

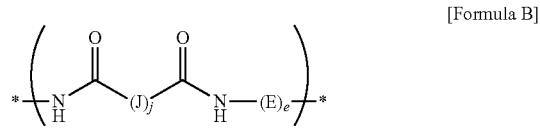

[Formula B]

In Formula B, E, J, e, and j are as described above.

For example, the diamine compound and the dicarbonyl compound may be polymerized to form amide repeat units represented by the following Formulae B-1 and B-2.

Alternatively, the diamine compound and the dicarbonyl compound may be polymerized to form amide repeat units represented by the following Formulae B-2 and B-3.

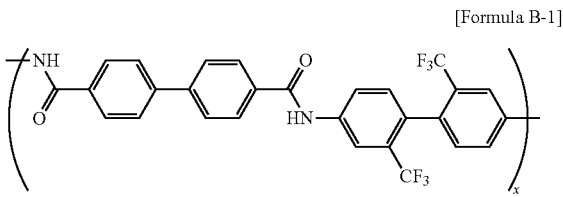

[Formula B-1]

In Formula B-1, x is an integer of 1 to 400.

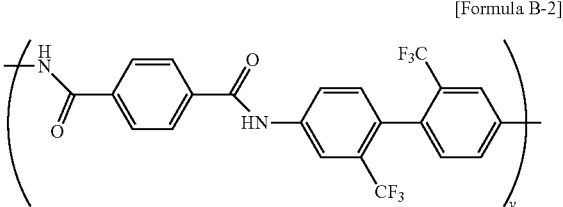

[Formula B-2]

In Formula B-2, x is an integer of 1 to 400.

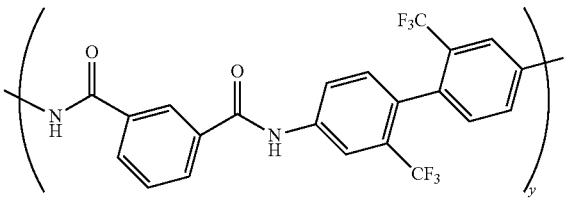

[Formula B-3]

In Formula B-3, y is an integer of 1 to 400.

According to an embodiment, the polyamide-imide polymer may comprise a repeat unit represented by the following Formula A and a repeat unit represented by the following Formula B:

[Formula A]

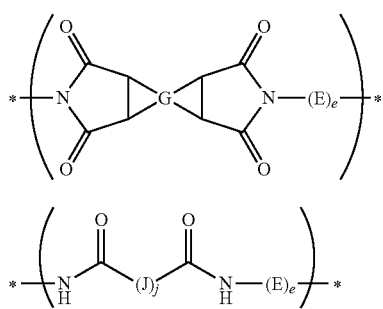

[Formula B]

In Formulae A and B,

E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—, e and j are each independently selected from integers of 1 to 5, when e is 2 or more, then the two or more Es are the same as, or different from, each other, when j is 2 or more, then the two or more Js are the same as, or different from, each other, G may be bonded by a bonding group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone or may be bonded to each other to form a condensed ring, a substituted or unsubstituted $C_2$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

In the polyamide-imide polymer, the molar ratio of the imide repeat unit to the amide repeat unit may be 2:98 to 45:55, 2:98 to 40:60, 2:98 to 35:65, 3:97 to 35:65, 2:98 to 15:85, 2:98 to 12:88, 2:98 to 10:90, or 3:97 to 10:90, but it is not limited thereto.

If the molar ratio of the imide repeat unit to the amide repeat unit is within the above range, the polyamide-imide film is excellent in optical properties such as transmittance, haze, and yellow index and mechanical properties such as modulus, tensile strength, and elongation at break.

In the polyamide-imide polymer, the molar ratio of the repeat unit represented by the above Formula A to the repeat unit represented by the above Formula B may be 2:98 to 45:55, 2:98 to 40:60, 2:98 to 35:65, 3:97 to 35:65, 2:98 to 15:85, 2:98 to 12:88, 2:98 to 10:90, or 3:97 to 10:90, but it is not limited thereto.

According to another embodiment, the polyimide-based film may further comprise a metal salt.

The metal of the metal salt may be at least one selected from the metals of Group 1, Group 2, Group 13, and Group 14. For example, the metal of the metal salt may be a metal of Group 1. As another example, the metal of the metal salt may be at least one selected from lithium (Li), sodium (Na), and potassium (K). For example, the metal salt may comprise lithium cations.

The anion of the metal salt may be at least one selected from halogen ions, carbonate ions, nitrate ions, phosphate ions, and sulfate ions. In addition, the anion may be a monovalent anion or a divalent anion.

The metal salt may be at least one selected from $Li_2CO_3$, LiBr, LiCl, $Na_2CO_3$, and NaCl. For example, the metal salt may be at least one selected from $Li_2CO_3$, LiBr, and LiCl.

The metal salt contained in the polyamide-imide film may be one type or two or more types. For example, the metal salt contained in the polyamide-imide film may be one type.

According to an embodiment, the metal salt contained in the polyamide-imide film may preferably be $Li_2CO_3$ or LiCl.

Since the polyamide-imide film comprises a metal salt, it is possible to prevent aggregation caused by the strong attractive forces present between the amide repeat units in the polyamide-imide polymer and to increase the solubility of the polymer in a solvent to thereby form a high-molecular-weight polyamide-imide polymer. Accordingly, it is possible to achieve a polyamide-imide film that is excellent in mechanical properties even at high temperatures and low temperatures.

The content of the metal salt is 0.1 to 2.0 parts by weight based on 100 parts by weight of the solids content of the polyamide-imide polymer.

Specifically, the content of the metal salt may be 0.1 to 1.8 parts by weight, 0.1 to 1.6 parts by weight, 0.3 to 1.5 parts by weight, 0.5 to 1.5 parts by weight, 0.5 to 1.2 parts by weight, or 0.5 to 1.0 parts by weight 100 parts by weight of the solids content of the polyamide-imide polymer, but it is not limited thereto.

If the content of the metal salt exceeds the above range, there may arise problems that the metal salt is eluted to the film surface and aggregates to form defects visually noticeable and that it is optically hazy and the transparency decreases, so that it cannot achieve the appearance quality as an optical film.

According to an embodiment, the polyamide-imide film may further comprise a filler.

The filler may be at least one selected from the group consisting of barium sulfate, silica, and calcium carbonate. As the polyamide-imide film comprises the filler, it is possible to enhance not only the roughness and winderability but also the effect of improving the scratches caused by sliding in the preparation of the film.

In addition, the filler may have a particle diameter of 0.01 μm to 1.0 μm. The particle diameter of the filler may be 0.01 μm to less than 1.0 μm, 0.02 μm to 0.9 μm, 0.05 μm to 0.9 μm, 0.1 μm to 0.8 μm, 0.1 μm to 0.7 μm, 0.1 μm to 0.6 μm, 0.1 μm to 0.5 μm, or 0.1 μm to 0.3 μm, but it is not limited thereto.

The polyamide-imide film may comprise the filler in an amount of 0.01 to 2.5% by weight based on the total weight of the polyamide-imide film.

According to an embodiment, the polyamide-imide film may have a transmittance of 80% or more. For example, the transmittance may be 85% or more, 88% or more, 80% to 99%, 85% to 99%, or 88% to 99%.

The polyamide-imide film has a haze of 1% or less. Specifically, the haze may be 0.8% or less, 0.7% or less, 0.6% or less, or 0.5% or less, but it is not limited thereto.

The polyamide-imide film has a yellow index of 5 or less. For example, the yellow index may be 4 or less, 3.8 or less, 3.5 or less, 3.0 or less, 2.8 or less, or 2.7 or less, but it is not limited thereto.

When the polyamide-imide film based on a thickness of 50 μm is folded to have a radius of curvature of 1 mm, the number of folding before the fracture is 200,000 or more, but it is not limited thereto. The number of folding counts one when the film is folded to have a radius of curvature of 1 mm and then unfolded.

The polyamide-imide film has a compressive strength of 0.4 kgf/μm or more. Specifically, the compressive strength may be 0.45 kgf/μm or more, or 0.46 kgf/μm or more, but it is not limited thereto.

When the polyamide-imide film is perforated at a speed of 10 mm/min using a 2.5-mm spherical tip in a UTM compression mode, the maximum diameter (mm) of perforation including a crack is 60 mm or less. Specifically, the maximum diameter of perforation may be 5 to 60 mm, 10 to 60 mm, 15 to 60 mm, 20 to 60 mm, 25 to 60 mm, or 25 to 58 mm, but it is not limited thereto.

The polyamide-imide film has a surface hardness of HB or higher. Specifically, the surface hardness may be H or higher, or 2H or higher, but it is not limited thereto.

The polyamide-imide film according to an embodiment may secure not only excellent optical properties such as low haze, low yellow index (YI), and high transmittance, but also excellent folding characteristics and excellent mechanical properties under the severe conditions of high temperatures and low temperatures.

Thus, it is possible to impart long-term stable mechanical properties to a substrate that requires flexibility in terms of modulus, elongation, tensile characteristics, and elastic restoring force.

The physical properties of the polyamide-imide film as described above are based on a thickness of 40 m to 60 μm. For example, the physical properties of the polyamide-imide film are based on a thickness of 50 μm.

The features on the components and properties of the polyamide-imide film as described above may be combined with each other.

For example, the polyamide-imide film may have a transmittance of 80% or more, a haze of 1% or less, and a yellow index of 5 or less, but it is not limited thereto.

In addition, the properties of the polyamide-imide film as described above are the results materialized by combinations of the chemical and physical properties of the components, which constitute the polyamide-imide film, along with the conditions in each step of the process for preparing the polyamide-imide film as described below.

Cover Window for a Display Device

The cover window for a display device according to an embodiment comprises a polyamide-imide film and a functional layer.

According to an embodiment, the polyamide-imide film comprises a polyamide-imide polymer and has an $MO_R$ value defined in the following Equation 1a of 75% or more.

$$MO_R(\%) = (MO_{2a}/MO_{1a}) \times 100 \quad \text{[Equation 1a]}$$

$MO_{1a}$ refers to the modulus of the film at room temperature, and $MO_{2a}$ refers to the modulus of the film at 60° C.

According to another embodiment, the polyamide-imide film comprises a polyamide-imide polymer and has a modulus ($MO_{1b}$) at room temperature of 5 GPa or more and a dMO value defined in the following Equation 1b of 1% to 8%.

$$dMO\ (\%) = \frac{|MO2b - MO1b|}{MO1b} \times 100 \quad \text{[Equation 1b]}$$

In Equation 1b, $MO_{1b}$ refers to the modulus of the film at room temperature, and $MO_{2b}$ refers to the modulus of the film measured at −20° C.

The details on the polyamide-imide film are as described above.

The cover window for a display device may be advantageously applied to a display device.

Further, the functional layer, let alone the polyamide-imide film, is excellent in folding characteristics, so that the cover window can be advantageously applied to a foldable display device, a rollable display device, or a flexible displace device.

The display device may be a foldable display device or a flexible displace device.

Display Device

The display device according to an embodiment comprises a display unit; and a cover window disposed on the display unit, wherein the cover window comprises a polyamide-imide film and a functional layer.

The polyamide-imide film comprises a polyamide-imide polymer and has an $MO_R$ value defined in the above Equation 1a of 75% or more.

The polyamide-imide film comprises a polyamide-imide polymer and has a modulus ($MO_{1b}$) at room temperature of 5 GPa or more and a dMO value defined in the above Equation 1b of 1% to 8%.

The details on the polyamide-imide film and the cover window are as described above.

FIG. 1 is a cross-sectional view of a display device according to an embodiment.

Specifically, FIG. 1 illustrates a display device, which comprises a display unit (400) and a cover window (300) disposed on the display unit (400), wherein the cover window comprises a polyamide-imide film (100) having a first side (101) and a second side (102) and a functional layer (200), and an adhesive layer (500) is interposed between the display device (400) and the cover window (300).

The display unit (400) is for displaying an image, and it may have flexible characteristics.

The display unit (400) may be a display panel for displaying an image. For example, it may be a liquid crystal display panel or an organic electroluminescent display panel. The organic electroluminescent display panel may comprise a front polarizing plate and an organic EL panel.

The front polarizing plate may be disposed on the front side of the organic EL panel. Specifically, the front polarizing plate may be attached to the side on which an image is displayed in the organic EL panel.

The organic EL panel displays an image by self-emission of a pixel unit. The organic EL panel may comprise an organic EL substrate and a driving substrate. The organic EL substrate may comprise a plurality of organic electroluminescent units, each of which corresponds to a pixel. Specifically, it may comprise a cathode, an electron transport layer, a light-emitting layer, a hole transport layer, and an anode. The driving substrate is operatively coupled to the organic EL substrate. That is, the driving substrate may be coupled to the organic EL substrate so as to apply a driving signal such as a driving current, so that the driving substrate can drive the organic EL substrate by applying a current to the respective organic electroluminescent units.

In addition, an adhesive layer (500) may be interposed between the display unit (400) and the cover window (300). The adhesive layer may be an optically transparent adhesive layer, but it is not particularly limited.

The cover window (300) is disposed on the display unit (400). The cover window is located at the outermost position of the display device according to an embodiment to thereby protect the display panel.

The cover window (300) may comprise a polyamide-imide film and a functional layer. The functional layer may be at least one selected from the group consisting of a hard coating, a reflectance reducing layer, an antifouling layer, and an antiglare layer. The functional layer may be coated on at least one side of the polyamide-imide film.

Since the display device according to an embodiment comprises a film having enhanced mechanical properties under the conditions of high temperatures and low temperatures, it can advantageously protect the display unit in a high-temperature environment.

Process for Preparing a Polyamide-Imide Film

An embodiment provides a process for preparing a polyamide-imide film.

The process for preparing a polyamide-imide film according to an embodiment comprises polymerizing a diamine compound, a dianhydride compound, and a dicarbonyl compound in an organic solvent to prepare a polyamide-imide polymer solution; charging the polymer solution into a tank; extruding and casting the polymer solution in the tank and then drying it to prepare a gel sheet; and thermally treating the gel sheet, wherein the thermal treatment of the gel sheet comprises hot air treatment in two or more steps.

Figure 2:
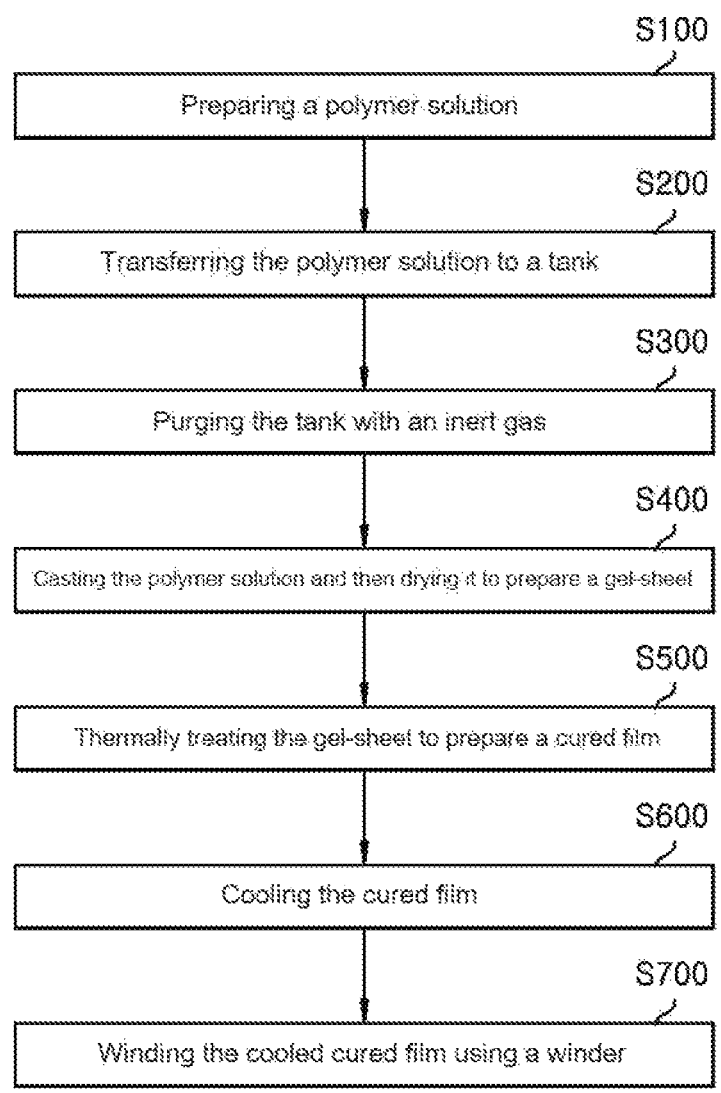
FIG. 2 is a schematic flow diagram of a process for preparing a polyamide-imide film according to an embodiment.

Specifically, referring to FIG. 2, the process for preparing a polyamide-imide film comprises simultaneously or sequentially mixing a diamine compound, a dianhydride compound, and a dicarbonyl compound in an organic solvent in a polymerization apparatus, and reacting the mixture to prepare a polymer solution (S100); transferring the polymer solution to a tank (S200); purging with an inert gas (S300); extruding and casting the polymer solution in the tank onto a belt and then drying it to prepare a gel-sheet (S400); thermally treating the gel-sheet while it is moved to prepare a cured film (S500); cooling the cured film while it is moved (S600); and winding the cooled cured film using a winder (S700).

The polyamide-imide film is a film that comprises a polyamide-imide resin as a main component. The polyamide-imide resin is a resin that comprises, as a structural unit, an amide repeat unit and an imide repeat unit at a predetermined molar ratio.

In the process for preparing a polyamide-imide film, a polymer solution for preparing the polyamide-imide resin is prepared by simultaneously or sequentially mixing a diamine compound, a dianhydride compound, and a dicarbonyl compound in an organic solvent in a polymerization apparatus, and reacting the mixture (S100).

In an embodiment, the polymer solution may be prepared by simultaneously mixing and reacting a diamine compound, a dianhydride compound, and a dicarbonyl compound in an organic solvent.

In another embodiment, the step of preparing the polymer solution may comprise first mixing and reacting the diamine compound and the dianhydride compound in a solvent to produce a polyamic acid (PAA) solution; and second mixing and reacting the polyamic acid (PAA) solution and the dicarbonyl compound to form an amide bond and an imide bond. The polyamic acid solution is a solution that comprises a polyamic acid.

Alternatively, the step of preparing the polymer solution may comprise first mixing and reacting the diamine compound and the dianhydride compound in a solvent to produce a polyamic acid solution; subjecting the polyamic acid solution to dehydration to produce a polyimide (PT) solution; and second mixing and reacting the polyimide (PT) solution and the dicarbonyl compound to further form an amide bond. The polyimide solution is a solution that comprises a polymer having an imide repeat unit.

In still another embodiment, the step of preparing the polymer solution may comprise first mixing and reacting the diamine compound and the dicarbonyl compound in a solvent to produce a polyamide (PA) solution; and second mixing and reacting the polyamide (PA) solution and the dianhydride compound to further form an imide bond. The polyamide solution is a solution that comprises a polymer having an amide repeat unit.

The polymer solution thus prepared may be a solution that comprises a polymer containing at least one selected from the group consisting of a polyamic acid (PAA) repeat unit, a polyamide (PA) repeat unit, and a polyimide (PI) repeat unit.

Alternatively, the polymer contained in the polymer solution comprises an imide repeat unit derived from the polymerization of the diamine compound and the dianhydride compound and an amide repeat unit derived from the polymerization of the diamine compound and the dicarbonyl compound.

The content of solids contained in the polymer solution may be 10% by weight to 30% by weight. Alternatively, the content of solids contained in the polymer solution may be 15% by weight to 25% by weight, but it is not limited thereto.

If the content of solids contained in the polymer solution is within the above range, a polyamide-imide film can be effectively produced in the extrusion and casting steps. In addition, the polyamide-imide film thus produced may have such mechanical properties as modulus, tensile strength, and elongation at break that are hardly deteriorated at high temperatures and optical properties in terms of a low yellow index and the like.

In an embodiment, the process may comprise dissolving a metal salt in an organic solvent before the step of preparing the polymer solution.

The details on the type and content of the metal salt are as described above.

In another embodiment, the step of preparing the polymer solution may further comprise introducing a catalyst.

Here, the catalyst may comprise at least one selected from the group consisting of beta picoline, acetic anhydride, isoquinoline (IQ), and pyridine-based compounds, but it is not limited thereto.

The catalyst may be added in an amount of 0.01 to 0.5 molar equivalent, 0.01 to 0.4 molar equivalent, or 0.01 to 0.3 molar equivalent, based on 1 mole of the polyamic acid, but it is not limited thereto.

The further addition of the catalyst may expedite the reaction rate and enhance the chemical bonding force between the repeat unit structures or that within the repeat unit structures.

In another embodiment, the step of preparing the polymer solution may further comprise adjusting the viscosity of the polymer solution.

Specifically, the step of preparing the polymer solution may comprise (a) simultaneously or sequentially mixing and reacting a diamine compound, a dianhydride compound, and a dicarbonyl compound in an organic solvent to prepare a first polymer solution; (b) measuring the viscosity of the first polymer solution and evaluating whether the target viscosity has been reached; and (c) if the viscosity of the first polymer solution does not reach the target viscosity, further adding the dicarbonyl compound to prepare a second polymer solution having the target viscosity.

The target viscosity may be 100,000 cps to 500,000 cps at room temperature. Specifically, the target viscosity may be 100,000 cps to 400,000 cps, 100,000 cps to 350,000 cps, 100,000 cps to 300,000 cps, 150,000 cps to 300,000 cps, or 150,000 cps to 250,000 cps, but it is not limited thereto.

In the steps of preparing the first polymer solution and the second polymer solution, the polymer solutions have viscosities different from each other. For example, the second polymer solution has a viscosity higher than that of the first polymer solution.

In the steps of preparing the first polymer solution and the second polymer solution, the stirring speeds are different from each other. For example, the stirring speed when the first polymer solution is prepared is faster than the stirring speed when the second polymer solution is prepared.

In still another embodiment, the step of preparing the polymer solution may further comprise adjusting the pH of the polymer solution. In this step, the pH of the polymer solution may be adjusted to 4 to 7, for example, 4.5 to 7 or 5 to 7.

The pH of the polymer solution may be adjusted by adding a pH adjusting agent. The pH adjusting agent is not particularly limited and may include, for example, amine-based compounds such as alkoxyamine, alkylamine, and alkanolamine.

If the pH of the polymer solution is adjusted to the above range, it is possible to prevent the damage to the equipment in the subsequent process, to prevent the occurrence of defects in the film produced from the polymer solution, and to achieve the desired optical properties and mechanical properties in terms of yellow index and modulus.

The pH adjusting agent may be employed in an amount of 0.1% by mole to 10% by mole, 0.1% by mole to 7.5% by mole, based on the total number of moles of monomers in the polymer solution.

In another embodiment, the step of preparing the polymer solution may further comprise purging with an inert gas. The step of purging with an inert gas may remove moisture, reduce impurities, increase the reaction yield, and impart excellent surface appearance and mechanical properties to the film finally produced.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The molar ratio of the dianhydride compound to the dicarbonyl compound used to prepare the polymer solution may be 2:98 to 45:55, 2:98 to 40:60, 2:98 to 35:65, 3:97 to 35:65, 2:98 to 15:85, 2:98 to 12:88, 2:98 to 10:90, or 3:97 to 10:90. If the dianhydride compound and the dicarbonyl compound are employed at the above molar ratio, it is advantageous for achieving the desired optical properties such as transmittance, haze, and yellow index and mechanical properties such as modulus, tensile strength, and elongation at break of the polyamide-imide film prepared from the polymer solution.

The details on the diamine compound, the dianhydride compound, and the dicarbonyl compound are as described above.

In an embodiment, the organic solvent may be at least one selected from the group consisting of dimethylformamide (DMF), dimethylacetamide (DMAc), N-methyl-2-pyrrolidone (NMP), m-cresol, tetrahydrofuran (THF), and chloroform. The organic solvent employed in the polymer solution may be dimethylacetamide (DMAc), but it is not limited thereto.

Next, after the step of preparing the polymer solution, the polymer solution is transferred to a tank (S200).

Figure 3:
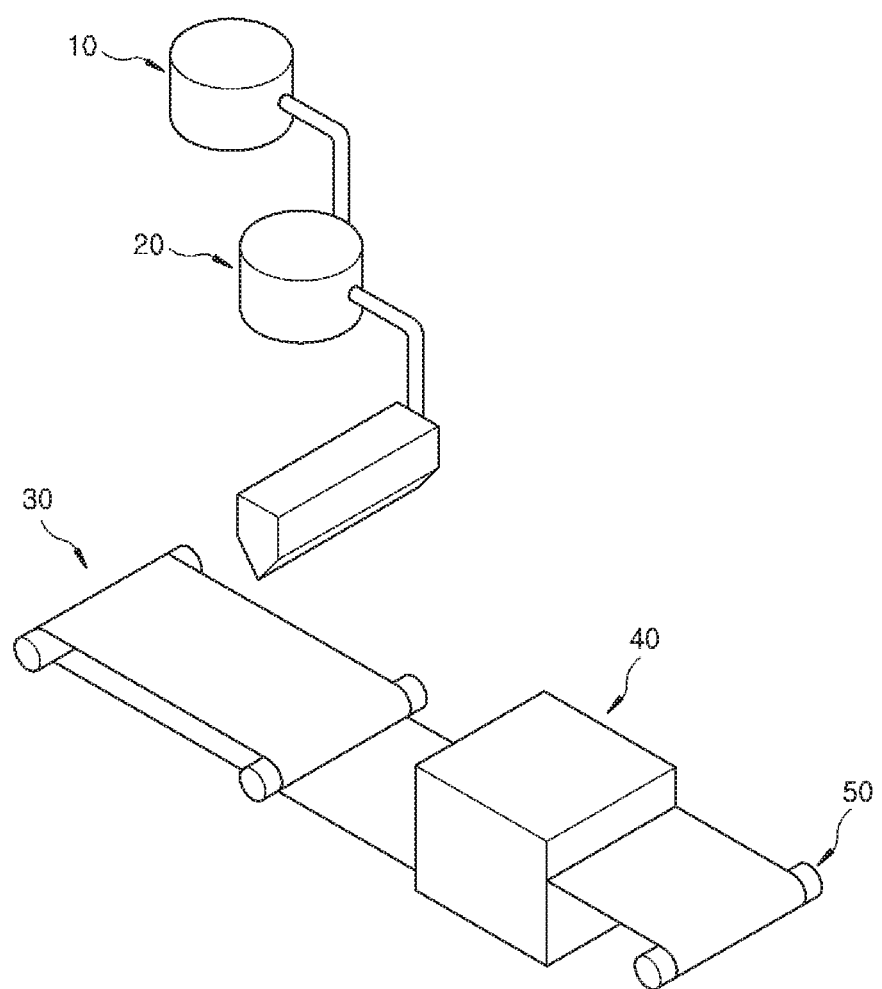
FIG. 3 schematically illustrates process facilities for preparing a polyamide-imide film according to an embodiment.

FIG. 3 schematically illustrates process facilities for preparing a polyamide-imide film according to an embodiment. Referring to FIG. 3, the polymer solution as described above is prepared in a polymerization apparatus (10), and the polymer solution thus produced is transferred to, and stored in, a tank (20).

Here, once the polymer solution has been prepared, the step of transferring the polymer solution to the tank is carried out without any additional steps. Specifically, the polymer solution prepared in the polymerization apparatus is transferred to, and stored in, the tank without any separate precipitation and redissolution steps for removing impurities. In the conventional process, in order to remove impurities such as hydrochloric acid (HCl) generated during the preparation of a polymer solution, the polymer solution thus prepared is purified through a separate step to remove the impurities, and the purified polymer solution is then redissolved in a solvent. In this case, however, there has been a problem that the loss of the active ingredient increases in the step of removing the impurities, resulting in decreases in the yield.

Accordingly, the preparation process according to an embodiment ultimately minimizes the amount of impurities generated in the step of preparing the polymer solution or properly controls the impurities in the subsequent steps, even if a certain amount of impurities is present, so as not to deteriorate the physical properties of the final film. Thus, the process has an advantage in that a film is produced without separate precipitation or redissolution steps.

The tank (20) is a place for storing the polymer solution before forming it into a film, and its internal temperature may be −20° C. to 20° C.

Specifically, the internal temperature may be −20° C. to 10° C., −20° C. to 5° C., −20° C. to 0° C., or 0° C. to 10° C., but it is not limited thereto.

If the internal temperature of the tank (20) is controlled to the above range, it is possible to prevent the polymer solution from deteriorating during storage, and it is possible to lower the moisture content to thereby prevent defects of the film produced therefrom.

The process for preparing a polyamide-imide film may further comprise carrying out vacuum degassing of the polymer solution transferred to the tank (20).

The vacuum degassing may be carried out for 30 minutes to 3 hours after depressurizing the internal pressure of the tank to 0.1 bar to 0.7 bar. The vacuum degassing under these conditions may reduce bubbles in the polymer solution. As a result, it is possible to prevent surface defects of the film produced therefrom and to achieve excellent optical properties such as haze.

In addition, the process for preparing a polyamide-imide film may further comprise purging the polymer solution transferred to the tank (20) with an inert gas (S300).

Specifically, the purging is carried out by purging the tank with an inert gas at an internal pressure of 1 atm to 2 atm. The nitrogen purging under these conditions may remove moisture in the polymer solution, reduce impurities to thereby increase the reaction yield, and achieve excellent optical properties such as haze and mechanical properties.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The step of vacuum degassing and the step of purging the tank with an inert gas are performed in a separate step, respectively.

For example, the step of vacuum degassing may be carried out, followed by the step of purging the tank with an inert gas, but it is not limited thereto.

The step of vacuum degassing and/or the step of purging the tank with an inert gas may improve the physical properties of the surface of the polyamide-imide film thus produced.

Thereafter, the process may further comprise storing the polymer solution in the tank (20) for 1 hour to 360 hours. Here, the temperature inside the tank may be kept at −20° C. to 20° C.

The process for preparing a polyamide-imide film may further comprise casting the polymer solution in the tank (20) and then drying it to prepare a gel-sheet (S400).

The polymer solution may be cast onto a casting body such as a casting roll or a casting belt.

Referring to FIG. 2, according to an embodiment, the polymer solution may be applied onto a casting belt (30) as a casting body, and it is dried while it is moved to be made into a sheet in the form of a gel.

When the polymer solution is injected onto the belt (30), the injection rate may be 300 g/min to 700 g/min. If the injection rate of the polymer solution satisfies the above range, the gel-sheet can be uniformly formed to an appropriate thickness.

In addition, the casting thickness of the polymer solution may be 200 m to 700 µm. If the polymer solution is cast to a thickness within the above range, the final film produced after the drying and thermal treatment may have an appropriate and uniform thickness.

As described above, the viscosity of the polymer solution at room temperature may be 100,000 cps to 500,000 cps, for example, 100,000 cps to 400,000 cps, 100,000 cps to 350,000 cps, 150,000 cps to 350,000 cps, or 150,000 cps to 250,000 cps. If the viscosity satisfies the above range, the polymer solution can be cast onto a belt in a uniform thickness without defects.

The drying step after the casting of the polymer solution may be carried out at a temperature of 80° C. to 140° C. for 5 minutes to 20 minutes. The solvent of the polymer solution is partially or totally volatilized during the drying to prepare the gel-sheet.

The moving speed of the gel-sheet on the casting body at the time of drying may be 0.1 m/min to 15 m/min, for example, 0.5 m/min to 10 m/min, but it is not limited thereto.

According to an embodiment, the step of fixing the ends of the gel sheet may be carried out after the step of preparing the gel sheet.

In the step of fixing the ends of the gel sheet, the gel sheet may be stretched by 0.99 to 1.1 times in the MD direction. Specifically, the gel sheet may be stretched by 0.99 to 1.08 times, 1.0 to 1.08 times, or 1.01 to 1.08 times, in the MD direction, but it is not limited thereto.

In addition, in the step of fixing the ends of the gel sheet, the gel sheet may be stretched by 0.99 to 1.1 times in the TD direction. Specifically, the gel sheet may be stretched by 0.99 to 1.08 times, 1.0 to 1.08 times, or 1.01 to 1.08 times, in the TD direction, but it is not limited thereto.

In addition, the gel sheet may be gradually stretched in the following thermal treatment step. Specifically, the gel sheet may be gradually stretched by about 1.01 to about 1.08 times in the following thermal treatment step.

The process for preparing a polyamide-imide film comprises thermally treating the gel-sheet while it is moved to prepare a cured film (S500).

Referring to FIG. 3, the thermal treatment of the gel-sheet may be carried out by passing it through a thermosetting device (40).

When the gel-sheet passes through the thermosetting device (40), it is treated with hot air.

If the thermal treatment is carried out with hot air, the heat may be uniformly supplied. If the heat is not uniformly supplied, satisfactory mechanical properties cannot be achieved. In particular, a satisfactory surface roughness cannot be achieved, which may raise or lower the surface tension too much.

According to an embodiment, the thermal treatment of the gel-sheet may be carried out in two or more steps.

According to another embodiment, the thermal treatment may be carried out until the content of the residual solvent contained in the film is 1,500 ppm or less, or 1,200 ppm or less.

Specifically, the thermal treatment comprises a first hot air treatment step carried out for 0.2 to 5 minutes in the range of 80° C. to 140° C.; and a second hot air treatment step carried out for 5 minutes to 150 minutes in the range of 160° C. to 350° C.

In the thermal treatment, the second thermal treatment step is carried out after the first thermal treatment step. In such event, if the content of the organic solvent contained in the gel-sheet exceeds 1,500 ppm or 1,200 ppm upon the second thermal treatment step, a third thermal treatment step may be additionally carried out.

The thermal treatment under these conditions may have the cured film thus prepared secure excellent folding characteristics, optical properties, and mechanical properties at high temperatures and low temperatures.

According to another embodiment, the thermal treatment may comprise passing it through an IR heater. The thermal treatment by an IR heater may be carried out for 1 minute to 30 minutes in a temperature range of 300° C. or higher. Specifically, the thermal treatment by an IR heater may be carried out for 1 minute to 20 minutes in a temperature range of 300° C. to 500° C.

The process for preparing a polyamide-imide film comprises cooling the cured film while it is moved (S600).

Referring to FIG. 3, the cooling of the cured film is carried out after it has been passed through the thermosetting device (40). It may be carried out by using a separate cooling chamber (not shown) or by forming an appropriate temperature atmosphere without a separate cooling chamber.

The step of cooling the cured film while it is moved may comprise a first temperature lowering step of reducing the temperature at a rate of 100° C./min to 1,000° C./min and a second temperature lowering step of reducing the temperature at a rate of 40° C./min to 400° C./min.

In such event, specifically, the second temperature lowering step is performed after the first temperature lowering step. The temperature lowering rate of the first temperature lowering step may be faster than the temperature lowering rate of the second temperature lowering step.

For example, the maximum rate of the first temperature lowering step is faster than the maximum rate of the second temperature lowering step. Alternatively, the minimum rate of the first temperature lowering step is faster than the minimum rate of the second temperature lowering step.

If the step of cooling the cured film is carried in such a multistage manner, it is possible to have the physical properties of the cured film further stabilized and to maintain the optical properties and mechanical properties of the film achieved during the curing step more stably for a long period of time.

The moving speed of the gel-sheet and the moving speed of the cured film are the same.

The process for preparing a polyamide-imide film comprises winding the cooled cured film using a winder (S700).

Referring to FIG. 2, the cooled cured film may be wound by using a roll-shaped winder (50).

In such event, the ratio of the moving speed of the gel-sheet on the belt at the time of drying to the moving speed of the cured film at the time of winding is 1:0.95 to 1:1.40. Specifically, the ratio of the moving speeds may be 1:0.99 to 1:1.20, 1:0.99 to 1:1.10, or 1:1.0 to 1:1.05, but it is not limited thereto.

If the ratio of the moving speeds is outside the above range, the mechanical properties of the cured film may be impaired, and the flexibility and elastic properties may be deteriorated.

In the process for preparing a polyamide-imide film, the thickness variation (%) according to the following Equation 1 may be 3% to 30%. Specifically, the thickness variation (%) may be 5% to 20%, but it is not limited thereto.

Thickness variation (%)=(M1−M2)/M2×100    [Equation 1]

In Equation 1, M1 is the thickness (μm) of the gel-sheet, and M2 is the thickness (μm) of the cooled cured film at the time of winding.

The polyamide-imide film is prepared by the preparation process as described above such that it is excellent in optical and mechanical properties. The polyamide-imide film may be applicable to various uses that require flexibility and transparency. For example, the polyamide-imide film may be applied to solar cells, displays, semiconductor devices, sensors, and the like.

The details on the polyamide-imide film prepared by the process for preparing a polyamide-imide film are as described above.

Hereinafter, the above description will be described in detail by referring to examples. However, these examples are set forth to illustrate the present invention, and the scope of the present invention is not limited thereto.

EXAMPLE

Example 1a

A 1-liter glass reactor equipped with a temperature-controllable double jacket was charged with dimethylacetamide (DMAc) as an organic solvent at 20° C. under a nitrogen atmosphere. Then, 1 part by weight of a metal salt (LiCl) was dissolved in the organic solvent based on 100 parts by weight of the solids content of the following polymer. Thereafter, 2,2'-bis(trifluoromethyl)-4,4'-diaminobiphenyl (2,2'-TFMB) was slowly added thereto and dissolved. Thereafter, 2,2'-bis(3,4-dicarboxyphenyl)hexafluoropropane dianhydride (6-FDA) was slowly added thereto, followed by stirring for 1 hour. Then, isophthaloyl chloride (IPC) was added, followed by stirring for 1 hour. And terephthaloyl chloride (TPC) was added, followed by stirring for 1 hour, thereby preparing a polymer solution. The polymer solution thus obtained was coated onto a glass plate and then dried under the drying conditions of temperature and time as shown in Table 1. It was then detached from the glass plate. Thereafter, the ends of the gel sheet were fixed to a pin frame, which was treated with hot air to obtain a polymer film having a thickness of 50 μm. The hot air treatment was carried out in two steps, and the temperatures and times of the first thermal treatment step and the second thermal treatment step are shown in Table 1. In addition, the gel sheet was stretched by about 1.03 times during the first thermal treatment step.

As to the contents of TFMB, 6FDA, TPC, and IPC, the number of moles of the dianhydride compound and the dicarbonyl compounds based on 100 moles of the diamine compound is shown in Table 1.

Examples 2a to 4a and Comparative Examples 1a to 3a

Films were prepared in the same manner as in Example 1a, except that the types and contents of the metal salt, process conditions, and the like were changed as shown in Table 1 below. The content of the metal salt shown in Table 1 below refers to the part by weight of the metal salt based on 100 parts by weight of the solids content of the polymer.

Example 1b

A 1-liter glass reactor equipped with a temperature-controllable double jacket was charged with dimethylacetamide (DMAc) as an organic solvent at 20° C. under a nitrogen atmosphere. Then, 1 part by weight of a metal salt (LiCl) was dissolved in the organic solvent based on 100 parts by weight of the solids content of the following polymer. Thereafter, 2,2'-bis(trifluoromethyl)-4,4'-diaminobiphenyl (2,2'-TFMB) was slowly added thereto and dissolved. Thereafter, 2,2'-bis(3,4-dicarboxyphenyl)hexafluoropropane dianhydride (6-FDA) was slowly added thereto, followed by stirring for 1 hour. Then, isophthaloyl chloride (IPC) was added, followed by stirring for 1 hour. And terephthaloyl chloride (TPC) was added, followed by stirring for 1 hour, thereby preparing a polymer solution. The polymer solution thus obtained was coated onto a glass plate and then dried under the drying conditions of temperature and time as shown in Table 2. It was then detached from the glass plate. Thereafter, the ends of the gel sheet were fixed to a pin frame, which was treated with hot air to obtain a polymer film having a thickness of 50 μm. The hot air treatment was carried out in two steps, and the temperatures and times of the first thermal treatment step and the second thermal treatment step are shown in Table 2. In addition, the gel sheet was stretched by about 1.03 times during the first thermal treatment step.

As to the contents of TFMB, 6FDA, TPC, and IPC, the number of moles of the dianhydride compound and the dicarbonyl compounds based on 100 moles of the diamine compound is shown in Table 2.

Examples 2b to 8b and Comparative Examples 1b and 2b

Films were prepared in the same manner as in Example 1b, except that the types and contents of the metal salt, the types and contents of the respective reactants, process conditions, and the like were changed as shown in Table 2 below. The content of the metal salt shown in Table 2 below refers to the part by weight of the metal salt based on 100 parts by weight of the solids content of the polymer.

EVALUATION EXAMPLE

The films prepared in Examples 1a to 4a, Comparative Examples 1a to 3a, Examples 1b to 8b, and Comparative Examples 1b and 2b were each measured and evaluated for the following properties. The results are shown in Tables 1 and 2 below.

Evaluation Example 1: Measurement of Film Thickness

The thickness was measured at 5 points in the transverse direction using a digital micrometer 547-401 manufactured by Mitutoyo Corporation. Their average value was adopted as the thickness.

Evaluation Example 2: Measurement of Tensile Strength

The film was cut to a size of 10 mm×150 mm by a laser cutting equipment (HPT500HJ from Hardram). It was stretched at a test speed of 12.5 mm/min using a UTM to measure the tensile strength at room temperature. This measurement was repeated three times.

In addition, the film was thermally treated in an oven at 60° C. for 3 minutes. It was then taken out of the oven, and the tensile strength was measured within 10 seconds by the above method.

The film was left in a low-temperature environment at −20° C. for 24 hours. It was then taken out of the low-temperature environment, and the tensile strength was measured within 1 minute by the above method.

Evaluation Example 3: Measurement of Elongation at Break

The film was cut to a size of 10 mm 150 mm by a laser cutting equipment (HPT500HJ from Hardram). It was stretched at a test speed of 12.5 mm/min using a UTM to measure the elongation at break at room temperature. This measurement was repeated three times.

In addition, the film was thermally treated in an oven at 60° C. for 3 minutes. It was then taken out of the oven, and the elongation at break was measured within 10 seconds by the above method.

The film was left in a low-temperature environment at −20° C. for 24 hours. It was then taken out of the low-temperature environment, and the elongation at break was measured within 1 minute by the above method.

Evaluation Example 4: Measurement of Modulus

The film was cut to a size of 10 mm×150 mm by a laser cutting equipment (HPT500HJ from Hardram). It was stretched at a test speed of 12.5 mm/min using a UTM to measure the modulus at room temperature. This measurement was repeated three times.

In addition, the film was thermally treated in an oven at 60° C. for 3 minutes. It was then taken out of the oven, and the modulus was measured within 10 seconds by the above method.

The film was left in a low-temperature environment at −20° C. for 24 hours. It was then taken out of the low-temperature environment, and the modulus was measured within 1 minute by the above method.

Evaluation Example 5: Measurement of Transmittance and Haze

The transmittance at 550 nm was measured using a haze meter NDH-5000W manufactured by Nippon Denshoku Kogyo.

Evaluation Example 6: Measurement of Yellow Index

The yellow index (YI) was measured with a spectrophotometer (UltraScan PRO, Hunter Associates Laboratory) using a CIE colorimetric system.

Evaluation Example 7: Measurement of Flexural Resistance

The polyamide-imide film having a thickness of 50 μm was subjected to repeated folding to have a radius of curvature of 1 mm and then unfolded (the number of folding counts one upon folding and unfolding). If it was not fractured upon repeated folding of 200,000 times, it was indicated as Pass. If fractured before repeated folding of 200,000 times, it was indicated as Fail. The number of folding times was counted using the U-shape folding equipment of YUASA.

Evaluation Example 8: Measurement of Folding Characteristics at Low Temperatures An adhesive layer (product name: OCA #8146 from 3M company) was interposed between the prepared film and a PET substrate to obtain a multilayer film. It was folded to have a radius of curvature of 3 mm, which was left at a low temperature of −20° C. for 72 hours, and then unfolded. The extent of wrinkles was visually observed. In such event, if no wrinkles were visually observed, it was evaluated as o. If wrinkles were visually observed slightly, it was evaluated as Δ. If wrinkles were visually observed readily, it was evaluated as x.

TABLE 1

| Composition | | Ex. 1a | Ex. 2a | Ex. 3a | Ex. 4a | C. Ex. 1a | C. Ex. 2a | C. Ex. 3a |
|---|---|---|---|---|---|---|---|---|
| | Diamine | TFMB 100 | TFMB 100 | TFMB 100 | TFMB 100 | TFMB 100 | TFMB 100 | TFMB 100 |
| | Dianhydride | 6FDA 3 | 6FDA 3 | 6FDA 10 | 6FDA 15 | 6FDA 24 | 6FDA 0 | 6FDA 0 |
| | Dicarbonyl compound | TPC 75 IPC 22 | TPC 75 IPC 22 | TPC 75 IPC 15 | TPC 75 IPC 10 | TPC 29 BPDC 47 | TPC 75 IPC 25 | TPC 75 IPC 25 |
| | Imide:amide | 3:97 | 3:97 | 10:90 | 15:85 | 24:76 | 0:100 | 0:100 |
| Type of metal salt | | LiCl | Li$_2$CO$_3$ | Li$_2$CO$_3$ | Li$_2$CO$_3$ | — | LiBr | LiBr |
| Content of metal salt (based on 100 parts by weight of polymer solids content) | | 1 | 0.5 | 0.5 | 0.5 | 0 | 1 | 1 |
| Tensile strength (TS$_{1a}$) | kgf/mm$^2$ | 32.1 | 31.6 | 30.4 | 27.7 | 26.3 | 29.2 | 21.3 |
| Tensile strength at high temperatures (TS$_{2a}$) | kgf/mm$^2$ | 26.4 | 25.9 | 24.6 | 23 | 18.7 | 21.6 | 17.1 |
| TS$_R$ | % | 82.24 | 81.96 | 80.92 | 83.03 | 71.10 | 73.97 | 80.28 |
| Elongation at break | % | 23.7 | 22.7 | 21.42 | 18.8 | 17.3 | 17.6 | 18.3 |

TABLE 1-continued

|  |  | Ex. 1a | Ex. 2a | Ex. 3a | Ex. 4a | C. Ex. 1a | C. Ex. 2a | C. Ex. 3a |
|---|---|---|---|---|---|---|---|---|
| ($EL_{1a}$) Elongation at break at high temperatures ($EL_{2a}$) | % | 20.7 | 18.2 | 18.9 | 15.1 | 14.7 | 14.4 | 14.3 |
| $EL_R$ | % | 87.34 | 80.18 | 88.24 | 80.32 | 84.97 | 81.82 | 78.14 |
| Modulus ($MO_{1a}$) | GPa | 7.43 | 7.25 | 6.8 | 6.5 | 5.86 | 7.4 | 7.6 |
| Modulus at high temperatures ($MO_{2a}$) | GPa | 5.8 | 5.8 | 5.4 | 5.1 | 4.2 | 5.3 | 5 |
| $MO_R$ | % | 78.06 | 80.00 | 79.41 | 78.46 | 71.67 | 71.62 | 65.79 |
| Film thickness | μm | 50 | 50 | 50 | 50 | 50 | 50 | 50 |
| Light transmittance | % | 88.8 | 88.9 | 89.5 | 89.6 | 88.9 | 88.5 | 87.9 |
| Haze | % | 0.5 | 0.5 | 0.4 | 0.4 | 0.5 | 0.8 | 2.4 |
| YI | — | 2.8 | 2.5 | 2.5 | 2.5 | 2.9 | 3.6 | 6.12 |
| Flexural resistance (1 R, 20K) |  | pass | pass | pass | pass | fail | fail | pass |
| Process | Drying step (temp./min.) | 125/15 | 125/15 | 115/15 | 115/15 | 150/20 | 150/20 | 115/15 |
|  | First thermal treatment step (temp./min.) | 125/1 | 125/1 | 115/1 | 115/1 | 150/1 | 150/1 | 115/1 |
|  | Second thermal treatment step (temp./min.) | 225/10 | 225/10 | 225/10 | 225/10 | 225/10 | 225/10 | 225/10 |

As can be seen from Table 1 above, the polyamide-imide films of Examples 1a to 4a had an $MO_R$ value of 75% or more. Thus, they maintained the modulus at least at a certain level even under the harsh conditions of high temperatures.

Since the display device is an electronic device, it generates heat during its use and it is to be used in a hot place as well, it is essential to secure mechanical properties at least at a certain level at high temperatures. Specifically, when a film is applied to a cover window for a display device, if the $MO_R$ value is 75% or more, no problem arises when a display device is fabricated.

In addition, the polyamide-imide films of Examples 1a to 4a were all excellent in the $TS_R$ value, $EL_R$ value, $MO_{1a}$ value, $TS_{1a}$ value, $EL_{1a}$ value, $MO_{2a}$ value, $TS_{2a}$ value, and $EL_{2a}$ value, in addition to the $MO_R$ value. That is, the polyamide-imide films of Examples 1a to 4a had high mechanical properties such as tensile strength, elongation at break, and modulus at room temperature and maintained the excellent mechanical properties even after the treatment under the severe conditions of high temperatures for a certain period of time.

Further, the polyamide-imide films of Examples 1a to 4a were all excellent in the evaluation of flexural resistance.

In contrast, since the films of Comparative Examples 1a to 3a had a low $MO_R$ value of 72% or less, when the film is applied to cover window for display device, it would have defects in appearance stability. In addition, the films of Comparative Examples 1a and 2a failed in the evaluation of flexural resistance. Thus, they are unsuitable for application to foldable display device or flexible display device.

TABLE 2

|  |  | Ex. 1b | Ex. 2b | Ex. 3b | Ex. 4b | Ex. 5b | Ex. 6b | Ex. 7b | Ex. 8b | C. Ex. 1b | C. Ex. 2b |
|---|---|---|---|---|---|---|---|---|---|---|---|
| Composition | Diamine | TFMB 100 | TFMB 100 | TFMB 100 | TFMB 100 | TFMB 100 | TFMB 100 | TFMB 100 | TFMB 100 | TFMB 100 | TFMB 100 |
|  | Dianhydride | 6FDA 3 | 6FDA 3 | 6FDA 7 | 6FDA 9 | 6FDA 12 | 6FDA 15 | 6FDA 24 | 6FDA 25 BPDA 10 | — | 6FDA 50 |
|  | Dicarbonyl compound | TPC 70 IPC 27 | TPC 70 IPC 27 | TPC 65 IPC 28 | TPC 69 IPC 22 | TPC 66 IPC 22 | TPC 75 IPC 10 | TPC 29 BPDC 47 | TPC 65 | TPC 75 IPC 25 | TPC 25 IPC 25 |
|  | Imide:amide | 3:97 | 3:97 | 7:93 | 9:91 | 12:88 | 15:85 | 24:76 | 35:65 | 0:100 | 50:50 |
| Type/content metal salt |  | LiCl/1 | LiCl/0.5 | — | — | — | — | — | — | LiBr/1 | — |
| Tensile strength ($TS_{1b}$) | kgf/mm² | 28.45 | 32.13 | 29.6 | 30.7 | 30.1 | 27.5 | 29.61 | 28.31 | 24.61 | 22.62 |
| Tensile strength at low temperatures ($TS_{2b}$) | kgf/mm² | 27.78 | 28.24 | 30.1 | 28.6 | 28 | 26.1 | 27.41 | 22.95 | 23.2 | 22.71 |
| dTS | % | 2.36 | 12.11 | 1.69 | 6.84 | 6.98 | 5.09 | 7.43 | 18.93 | 5.73 | 0.40 |
| Elongation at break ($EL_{1b}$) | % | 19.89 | 23.67 | 19.2 | 23.1 | 23 | 19.4 | 27.8 | 27.81 | 17 | 8.9 |
| Elongation at break at low temperatures ($EL_{2b}$) | % | 23.06 | 17.68 | 21.5 | 19 | 19.5 | 17.1 | 21.2 | 20.6 | 16.2 | 11.71 |
| dEL | % | 115.94 | 25.31 | 11.98 | 17.75 | 15.22 | 11.86 | 23.74 | 25.93 | 4.71 | 31.57 |
| Modulus ($MO_{1b}$) | GPa | 7.42 | 7.43 | 6.02 | 5.92 | 5.54 | 6.15 | 6.44 | 6.65 | 7.45 | 4.83 |
| Modulus at low temperatures ($MO_{2b}$) | GPa | 7.57 | 7.64 | 6.21 | 6.03 | 5.71 | 6.32 | 6.55 | 6.76 | 7.46 | 4.87 |

TABLE 2-continued

|  |  | Ex. 1b | Ex. 2b | Ex. 3b | Ex. 4b | Ex. 5b | Ex. 6b | Ex. 7b | Ex. 8b | C. Ex. 1b | C. Ex. 2b |
|---|---|---|---|---|---|---|---|---|---|---|---|
| dMO | % | 2.02 | 2.83 | 3.16 | 1.86 | 3.07 | 2.76 | 1.71 | 11.65 | 0.13 | 0.83 |
| $LM_{O1}$ | GPa | 1.476 | 1.759 | 1.156 | 1.368 | 1.274 | 1.193 | 1.790 | 1.849 | 1.267 | 0.430 |
| $LM_{O2}$ | GPa | 1.746 | 1.351 | 1.335 | 1.146 | 1.113 | 1.081 | 1.389 | 1.393 | 1.209 | 0.570 |
| Thickness | μm | 50 | 50 | 50 | 50 | 50 | 50 | 50 | 50 | 50 | 50 |
| Transmittance | % | 89 | 89 | 89 | 89.1 | 89.3 | 89 | 89 | 88.5 | 88.4 | 90.8 |
| Haze | % | 0.47 | 0.48 | 0.66 | 0.52 | 0.67 | 0.56 | 0.46 | 0.54 | 2.41 | 0.41 |
| YI | — | 2.62 | 2.65 | 3.4 | 2.96 | 3.12 | 2.44 | 2.87 | 2.7 | 4.59 | 141 |
| Folding evaluation at low temperatures (3 R, −20° C., 72 hours) |  | ○ | Δ | ○ | ○ | ○ | ○ | ○ | Δ | x | x |
| Process (temp/min.) | Drying | 125/15 | 125/15 | 125/15 | 125/15 | 115/15 | 115/15 | 115/15 | 115/15 | 150/20 | 115/15 |
|  | First thermal treatment | 125/1 | 125/1 | 125/1 | 125/1 | 115/1 | 115/1 | 115/1 | 115/1 | 150/1 | 150/1 |
|  | Second thermal treatment | 225/10 | 225/10 | 225/10 | 225/10 | 225/10 | 225/10 | 225/10 | 225/10 | 225/10 | 225/10 |

As can be seen from Table 2 above, the polyamide-imide films of Examples 1b to 8b had a dMO value of 1% to 8%. Thus, they maintained the modulus at least at a certain level even under the harsh conditions of low temperatures.

In the case where the polyamide-imide film is applied to a cover window for a display device and to a display device, it may be used in an extremely cold environment. Thus, it is essential to secure mechanical properties at least at a certain level even in such an extremely cold environment. Specifically, when the polyamide-imide film is applied to a cover window for a display device and to a display device, if the dMO value is within 1% to 8%, no problem arises.

In addition, the polyamide-imide films of Examples 1b to 8b were all excellent in the dTS value, dEL value, $MO_{1b}$ value, $TS_{1b}$ value, $EL_{1b}$ value, $MO_{2b}$ value, $TS_{2b}$ value, and $EL_{2b}$ value, in addition to the dMO value. That is, the polymer films of Examples 1b to 8b had high mechanical properties such as tensile strength, elongation at break, and modulus at room temperature and maintained the excellent mechanical properties even after the treatment under the severe conditions of low temperatures for a certain period of time.

Further, the polyamide-imide films of Examples 1b to 8b were all excellent in the folding characteristics at low temperatures.

In contrast, since the films of Comparative Examples 1b and 2b had a low dMO value of 1% or less, when it is applied to a cover window for a display device, it would not be balanced with other layers, resulting in cracks, which is defective in terms of the appearance stability. In addition, the films of Comparative Examples 1b and 2b failed in the evaluation of flexural resistance at low temperatures. Thus, they are unsuitable for application to a foldable display device or a flexible display device.

REFERENCE NUMERALS OF THE DRAWINGS

10: polymerization apparatus
20: tank
30: belt
40: thermosetting device
50: winder
100: polyamide-imide film
101: first side
102: second side
200: functional layer
300: cover window
400: display unit
500: adhesive layer

The invention claimed is:

1. A polyamide-imide film, which comprises a polyamide-imide polymer and has an $MO_R$ value defined in the following Equation 1a of 75% or more:

$$MO_R(\%)=(MO_{2a}/MO_{1a})\times 100 \quad \text{[Equation 1a]}$$

wherein $MO_{1a}$ refers to the modulus of the film at room temperature, and $MO_{2a}$ refers to the modulus of the film at 60° C., wherein the polyamide-imide polymer comprises an imide repeat unit and an amide repeat unit, and the molar ratio of the imide repeat unit to the amide repeat unit is 3:97 to 15:85, wherein the imide repeat unit is derived from the polymerization of a diamine compound and a dianhydride compound, and wherein the dianhydride compound comprises 2,2'-bis-(3,4-dicarboxyphenyl) hexafluoropropane dianhydride (6FDA), and the diamine compound comprises 2,2'-bis(trifluoromethyl)-4,4'-diaminobiphenyl (TFMB).

2. The polyamide-imide film of claim 1, which has a $TS_R$ value defined in the following Equation 2a of 80% or more:

$$TS_R(\%)=(TS_{2a}/TS_{1a})\times 100 \quad \text{[Equation 2a]}$$

wherein $TS_{1a}$ refers to the tensile strength of the film at room temperature, and $TS_{2a}$ refers to the tensile strength of the film at 60° C.

3. The polyamide-imide film of claim 1, which has an $EL_R$ value defined in the following Equation 3a of 80% or more:

$$EL_R(\%)=(EL_{2a}/EL_{1a})\times 100 \quad \text{[Equation 3a]}$$

wherein $EL_{1a}$ refers to the elongation at break of the film at room temperature, and $EL_{2a}$ refers to the elongation at break of the film at 60° C.

4. The polyamide-imide film of claim 1, which has a modulus ($MO_{1a}$) of 6 GPa or more when measured at room temperature, a tensile strength ($TS_{1a}$) of 25 kgf/mm² or more when measured at room temperature, and an elongation at break ($EL_{1a}$) of 18% or more when measured at room temperature.

5. The polyamide-imide film of claim 1, which has a modulus ($MO_{2a}$) of 5 GPa or more when measured at 60° C., a tensile strength ($TS_{2a}$) of 20 kgf/mm² or more when measured at 60° C., and an elongation at break ($EL_{2a}$) of 15% or more when measured at 60° C.

6. The polyamide-imide film of claim 1, which has a modulus ($MO_{1b}$) at room temperature of 5 GPa or more and a dMO value defined in the following Equation 1b of 1% to 8%:

$$dMO\ (\%) = \frac{|MO2b - MO1b|}{MO1b} \times 100 \quad \text{[Equation 1b]}$$

in Equation 1b, $MO_{1b}$ refers to the modulus of the film at room temperature, and $MO_{2b}$ refers to the modulus of the film measured at −20° C.

7. The polyamide-imide film of claim 1, which further comprises a metal salt, wherein the content of the metal salt is 0.1 to 2.0 parts by weight based on 100 parts by weight of the solids content of the polyamide-imide polymer.

8. A cover window for a display device, which comprises a polyamide-imide film and a functional layer, wherein the polyamide-imide film comprises a polyamide-imide polymer and has an $MO_R$ value defined in the following Equation 1a of 75% or more:

$$MO_R(\%) = (MO_{2a}/MO_{1a}) \times 100 \quad \text{[Equation 1a]}$$

wherein $MO_{1a}$ refers to the modulus of the film at room temperature, and $MO_{2a}$ refers to the modulus of the film at 60° C., wherein the polyamide-imide polymer comprises an imide repeat unit and an amide repeat unit, and the molar ratio of the imide repeat unit to the amide repeat unit is 3:97 to 15:85, wherein the imide repeat unit is derived from the polymerization of a diamine compound and a dianhydride compound, and wherein the dianhydride compound comprises 2,2'-bis-(3,4-dicarboxyphenyl) hexafluoropropane dianhydride (6FDA), and the diamine compound comprises 2,2'-bis (trifluoromethyl)-4,4'-diaminobiphenyl (TFMB).

9. A process for preparing the polyamide-imide film of claim 1, which comprises:

polymerizing a diamine compound, a dianhydride compound, and a dicarbonyl compound in an organic solvent to prepare a polyamide-imide polymer solution;

charging the polymer solution into a tank;

extruding and casting the polymer solution in the tank and then drying it to prepare a gel sheet; and thermally treating the gel sheet, wherein the thermal treatment step of the gel sheet comprises two or more treatment steps with hot air.

10. The process of claim 9 for preparing the polyamide-imide film, which comprises fixing the ends of the gel sheet after the step of preparing the gel sheet.

* * * * *